US012711810B2

(12) United States Patent
Ma et al.

(10) Patent No.: US 12,711,810 B2
(45) Date of Patent: Aug. 18, 2026

(54) METHOD, APPARATUS AND SYSTEM FOR IMPLEMENTING FINGERPRINT ENROLLMENT

(71) Applicant: FEITIAN TECHNOLOGIES CO., LTD., Beijing (CN)

(72) Inventors: Baohua Ma, Beijing (CN); Zhou Lu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 19/135,272

(22) PCT Filed: Oct. 31, 2023

(86) PCT No.: PCT/CN2023/128930
§ 371 (c)(1),
(2) Date: Jun. 3, 2025

(87) PCT Pub. No.: WO2024/259866
PCT Pub. Date: Dec. 26, 2024

(65) Prior Publication Data

US 2026/0204102 A1 Jul. 16, 2026

(30) Foreign Application Priority Data

Jun. 20, 2023 (CN) ......................... 202310727858.7

(51) Int. Cl.
*G06V 40/50* (2022.01)
*G06V 40/60* (2022.01)

(52) U.S. Cl.
CPC .............. *G06V 40/50* (2022.01); *G06V 40/67* (2022.01)

(58) Field of Classification Search
CPC ................................ G06V 40/50; G06V 40/67
See application file for complete search history.

(56) References Cited

U.S. PATENT DOCUMENTS

2019/0122089 A1* 4/2019 Benkley, III .......... G07F 7/1025
2020/0050911 A1* 2/2020 Prawitz ................. G06V 40/13
(Continued)

FOREIGN PATENT DOCUMENTS

CN 106407952 A 2/2017
CN 106960480 A 7/2017
(Continued)

OTHER PUBLICATIONS

Search Report and Written Opinion issued on Dec. 11, 2023, in corresponding International Application No. PCT/CN2023/128930, 27 pages.

(Continued)

*Primary Examiner* — Abhishek Sarma
(74) *Attorney, Agent, or Firm* — Maier & Maier, PLLC

(57) ABSTRACT

A method for implementing fingerprint enrollment. Upon detecting a level change at a card presence detect pin of a card holder, an MCU controls to supply power to a fourth contact of a card holder after pulling down a fifth I/O pin, controls a second I/O pin and a third I/O pin to output low and high levels respectively. The MCU enables and resets a second timer when the first contact of the card holder outputs the high and low levels in sequence; delays a second preset duration when the first contact of the card holder outputs the high level and a count of the second timer is within a first preset range; prompts that the fingerprint enrollment is successful when the first contact of the card holder outputs the low level, and prompts a user to enroll his fingerprint when a first timer reaches the first preset duration.

16 Claims, 21 Drawing Sheets

(56) References Cited

U.S. PATENT DOCUMENTS

| | | | | |
|---|---|---|---|---|
| 2021/0056286 | A1 | 2/2021 | Cheng | |
| 2022/0147786 | A1* | 5/2022 | Gouabau | G06K 19/07354 |
| 2023/0069172 | A1* | 3/2023 | Aubin | G06F 21/34 |

FOREIGN PATENT DOCUMENTS

| | | | |
|---|---|---|---|
| CN | 107609381 | A | 1/2018 |
| CN | 109684885 | A | 4/2019 |
| CN | 109882026 | A | 6/2019 |
| CN | 110210397 | A | 9/2019 |
| CN | 111445000 | A | 7/2020 |
| CN | 112596600 | A | 4/2021 |
| CN | 113312607 | A | 8/2021 |
| CN | 114565069 | A | 5/2022 |
| CN | 115562895 | A | 1/2023 |
| CN | 116110137 | A | 5/2023 |
| CN | 116483014 | A | 7/2023 |
| WO | 2019047739 | A1 | 3/2019 |
| WO | 2021104401 | A1 | 6/2021 |
| WO | 2023011168 | A1 | 2/2023 |

OTHER PUBLICATIONS

Notice of Allowance issued on Jul. 28, 2023, in corresponding Chinese Application No. 202310727858.7, 7 pages.

Wu, "Application of Ultrasonic Fingerprint Identification in Vehicle Entry System", Auto Engineer, Sep. 25, 2018, vol. 9, 5 pages, with English Abstract.

Gu et al., "Design of Intelligent Fingerprint Access System Based on STM32", Journal of Jinling Institute of Technology, China Academic Journal Electronic Publishing House, Mar. 30, 2021, vol. 37, No. 1, 5 pages, with English Abstract.

* cited by examiner

201: upon detecting a level change at pin PIN9 of a card holder, an MCU controls a MOSFET to turn on to supply power to pin PIN1 of the card holder after pulling down pin PA1, and controls pin PA0 to output a low level and pin PA3 to output a high level 202: the MCU initializes a first timer, sets an interrupt time to a first preset duration, enables a timer interrupt, sets to allow a fingerprint icon and a numeric icon to flash, and sets to allow the fingerprint icon and the numeric icon to be displayed 203: the MCU initializes the number of times for which a fingerprint of each finger needs to be enrolled and the number of fingers that need to be enrolled

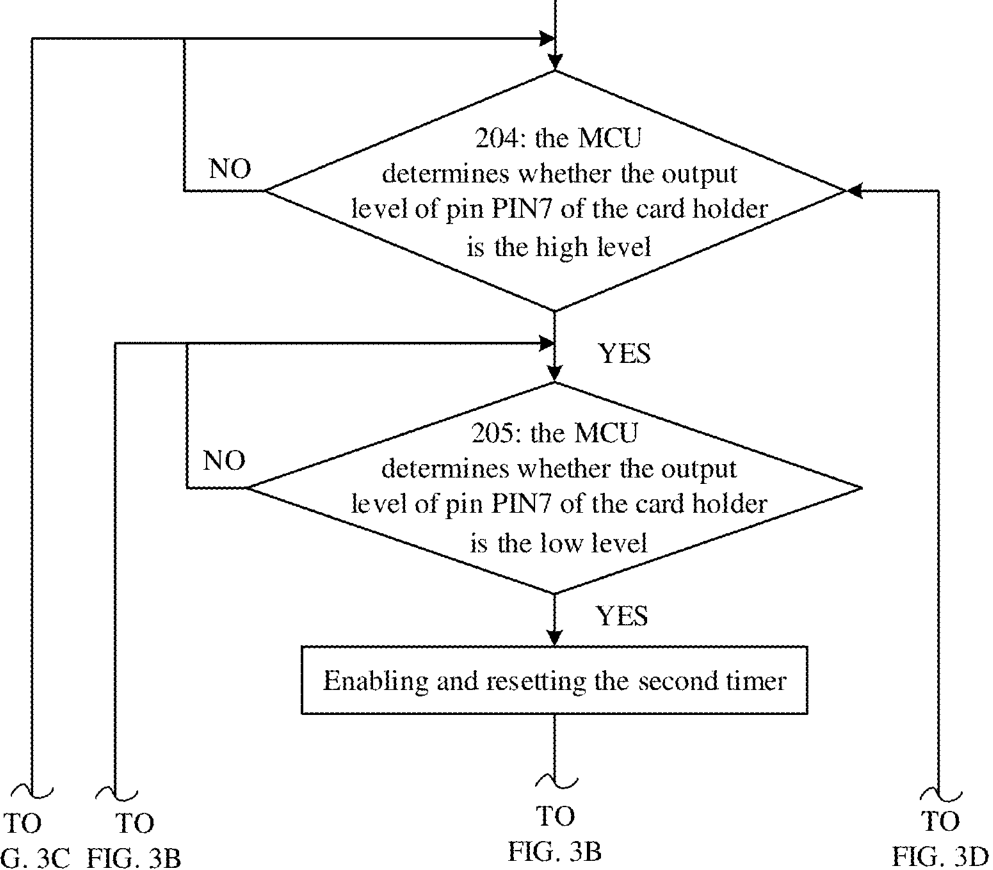

FIG. 3A

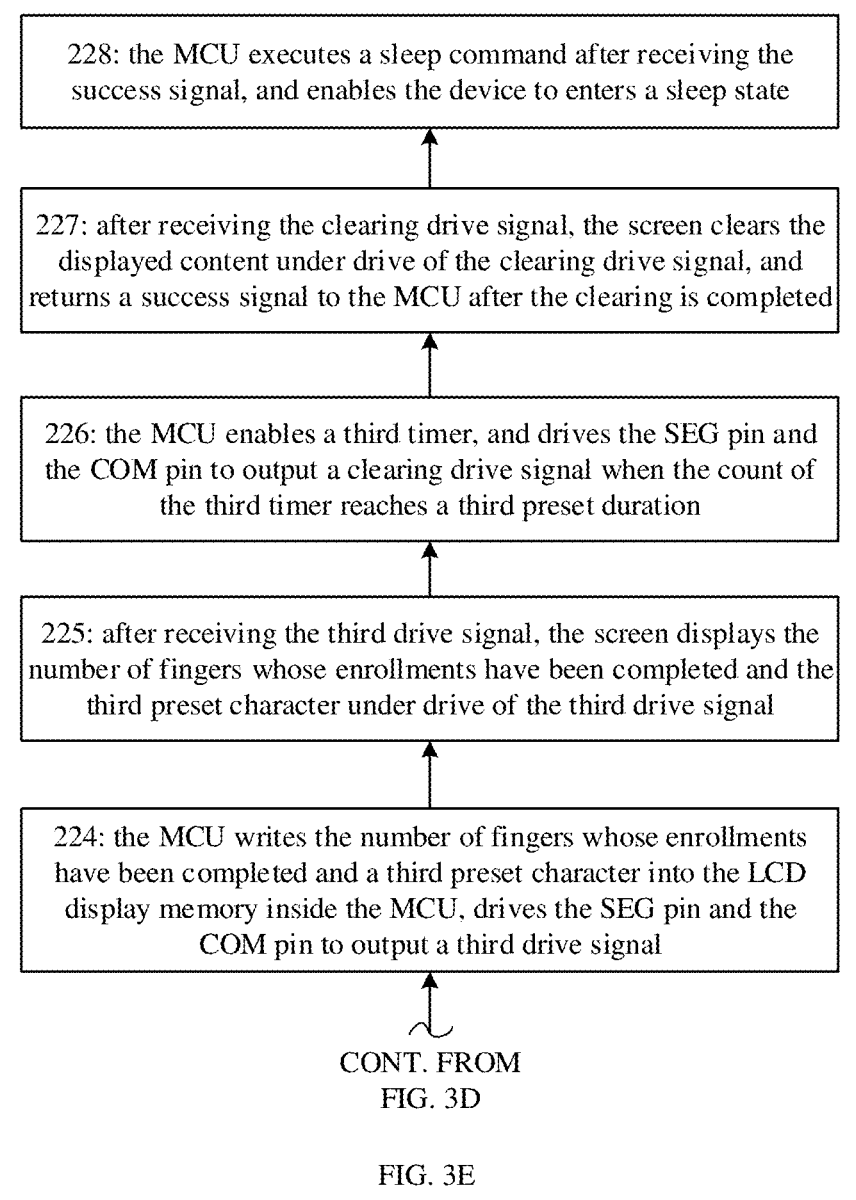

228: the MCU executes a sleep command after receiving the success signal, and enables the device to enters a sleep state 227: after receiving the clearing drive signal, the screen clears the displayed content under drive of the clearing drive signal, and returns a success signal to the MCU after the clearing is completed 226: the MCU enables a third timer, and drives the SEG pin and the COM pin to output a clearing drive signal when the count of the third timer reaches a third preset duration 225: after receiving the third drive signal, the screen displays the number of fingers whose enrollments have been completed and the third preset character under drive of the third drive signal 224: the MCU writes the number of fingers whose enrollments have been completed and a third preset character into the LCD display memory inside the MCU, drives the SEG pin and the COM pin to output a third drive signal

CONT. FROM FIG. 3D

FIG. 3E

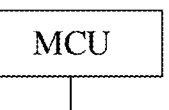

301: upon detecting a level change at pin PIN9 of a card holder, the MCU pulls low pin PA1, controls a MOSFET to turn on to supply power to pin PIN1 of the card holder, and controls pin PA0 to output a low level and pin PA3 to output a high level 302: the MCU initializes a first timer, presets an interrupt time to a first preset duration, enables a timer interrupt, sets to allow a fingerprint icon and a numeric icon to flash, and sets to allow the fingerprint icon and the numeric icon to be displayed 303: the MCU initializes the number of times for which a fingerprint of each finger needs to be enrolled and the number of fingers that need to be enrolled

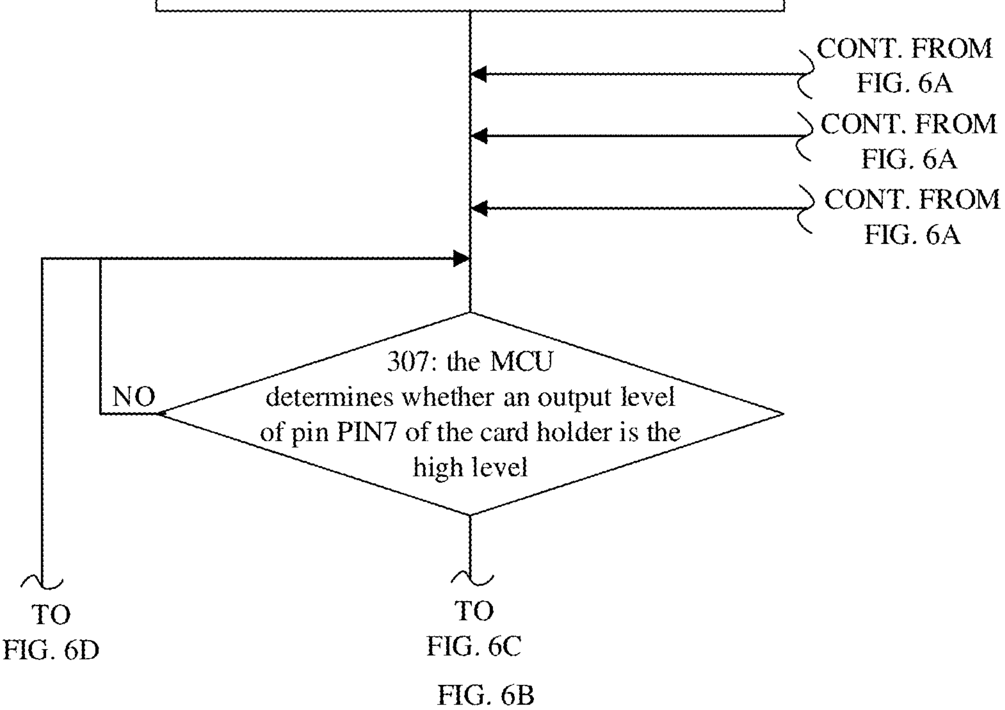

FIG. 6B

METHOD, APPARATUS AND SYSTEM FOR IMPLEMENTING FINGERPRINT ENROLLMENT

CROSS-REFERENCE TO RELATED APPLICATIONS

The present application is a national stage of International application No. PCT/CN2023/128930, filed on Oct. 31, 2023, which claims priority to the Chinese patent application No. 202310727858.7, entitled "METHOD, APPARATUS AND SYSTEM FOR IMPLEMENTING FINGERPRINT ENROLLMENT" filed with the China National Intellectual Property Administration on Jun. 20, 2023. Both of the aforementioned applications are hereby incorporated by reference in their entireties.

TECHNICAL FIELD

The present disclosure relate to the field of electronic products and, in particular, to a method, an apparatus and a system for implementing fingerprint enrollment.

BACKGROUND

In prior art, a single fingerprint card is incapable of independently completing a fingerprint enrollment operation, and requires the assistant from an external device. However, most external devices need to communicate with the fingerprint card using the 7816 method, which is relatively complex to implement. This complexity limits the usage of the fingerprint card (application scenarios and scope of the fingerprint card are limited). Therefore, it is urgent to provide an implementation solution that is not restricted by communication methods between the fingerprint card and the external device.

SUMMARY

Purposes of the present disclosure are to overcome shortcomings of the prior art and provide a method, an apparatus and a system for implementing fingerprint enrollment.

In a first aspect, an embodiment of the present disclosure provides a method for implementing fingerprint enrollment, including:

Step S1: upon detecting a level change at a card presence detect pin of a card holder, controlling, by an MCU, a MOSFET to turn on to supply power to a fourth contact of the card holder after pulling down a fifth I/O pin, and controlling, by the MCU, a second I/O pin to output a low level and a third I/O pin to output a high level;

Step S2: determining, by the MCU, whether an output level of a first contact of the card holder is a high level; if so, executing Step S3; otherwise, returning to the Step S2;

Step S3: determining, by the MCU, whether the output level of the first contact of the card holder is a low level; if so, enabling and resetting a second timer, and executing Step S4; otherwise, returning to the Step S3;

Step S4: determining, by the MCU, whether the output level of the first contact of the card holder is the high level; if so, executing Step S6; otherwise, executing Step S5;

Step S5: determining, by the MCU, whether a count of the second timer is less than a second preset duration; if so, returning to the Step S4; otherwise, prompting that a fingerprint card is malfunctioning;

Step S6: determining, by the MCU, whether the count of the second timer is within a first preset range; if so, delaying the second preset duration and executing Step S8; otherwise, executing Step S7;

Step S7: determining, by the MCU, whether the count of the second timer is within a second preset range; if so, returning to the Step S3; otherwise, prompting that the fingerprint card is malfunctioning;

Step S8: detecting, by the MCU, the output level of the first contact of the card holder; if the output level of the first contact of the card holder is the low level, prompting that the fingerprint enrollment is successful; if the output level of the first contact of the card holder is the high level, prompting that the fingerprint enrollment is failed;

between the Step S1 and the Step S2, the method includes: initializing, by the MCU, a first timer, setting an interrupt time to a first preset duration, and enabling a timer interrupt;

the method further includes: entering a timer interrupt processing when the first timer reaches the first preset duration, where the timer interrupt processing includes prompting a user to enroll a fingerprint.

In a second aspect, another embodiment of the present disclosure provides a method for implementing fingerprint enrollment, which is applicable for a system including a device and a fingerprint card; where the device includes an MCU, a screen, a battery, a card power control module, and a card holder; a fifth I/O pin of the MCU is connected to a MOSFET of the card power control module, and the MOSFET of the card power control module is connected to a fourth contact of the card holder; a first I/O pin, a second I/O pin, a third I/O pin, and a fourth I/O pin of the MCU are respectively connected to a first contact, a second contact, a third contact and a card presence detect pin of the card holder; the first contact, the second contact, the third contact, the fourth contact, and a fifth contact of the card holder are respectively connected to a first pin, a second pin, a third pin, a fourth pin, and a fifth pin of a chip on the fingerprint card; and the method includes:

Step Y1: when the MCU detects a level change at the card presence detect pin of the card holder, controlling, by the MCU, the MOSFET to turn on to supply power to the fourth contact of the card holder after pulling down the fifth I/O pin, and controlling, by the MCU, the second I/O pin to output a low level and the third I/O pin to output a high level;

Step Y2: waiting, by the fingerprint card, for a user to enroll a fingerprint after detecting that the second pin and the third pin are at the low level and the high level respectively;

Step Y3: determining, by the fingerprint card, whether the fingerprint enrolled by the user is received within a preset time; if so, outputting a square wave with a frequency of a first preset Hertz value through the first pin, and executing Step Y4; otherwise, outputting a square wave with a frequency of a second preset Hertz value through the first pin, and Step Y5 is executed;

Step Y4: determining, by the fingerprint card, whether the received fingerprint is valid; if so, outputting a low level through the first pin, and Step Y5 is executed; otherwise, outputting a high level through the first pin, and Step Y5 is executed;

Step Y5: determining, by the MCU, whether an output level of the first contact of the card holder is a high level; if so, executing Step Y6; otherwise, returning to the Step Y5;

Step Y6: determining, by the MCU, whether the output level of the first contact of the card holder is a low level; if so, enabling and resetting a second timer, and executing Step Y7; otherwise, returning to the Step Y6;

Step Y7: determining, by the MCU, whether the output level of the first contact of the card holder is the high level; if so, executing Step Y9; otherwise, executing Step Y8;

Step Y8: determining, by the MCU, whether a count of the second timer is less than a second preset duration; if so, returning to the Step Y7; otherwise, prompting that the fingerprint card is malfunctioning;

Step Y9: determining, by the MCU, whether the count of the second timer is within a first preset range; if so, delaying the second preset duration, and executing Step Y11; otherwise, executing Step Y10;

Step Y10: determining, by the MCU, whether the count of the second timer is within a second preset range; if so, returning to the Step Y6; otherwise, prompting that the fingerprint card is malfunctioning;

Step Y11: detecting, by the MCU, the output level of the first contact of the card holder; if the output level of the first contact of the card holder is the low level, prompting that the fingerprint enrollment is successful; if the output level of the first contact of the card holder is the high level, prompting that the fingerprint enrollment is failed;

the Step Y1 further includes: initializing, by the MCU, a first timer, setting an interrupt time to a first preset duration, and enabling a timer interrupt;

the method further includes: entering a timer interrupt processing when the first timer reaches the first preset duration, where the timer interrupt processing includes prompting the user to enroll a fingerprint.

In a third aspect, an embodiment of the present disclosure provides an apparatus for implementing fingerprint enrollment, including:

a detecting and electrifying module, configured to control a MOSFET to turn on to supply power to a fourth contact of a card holder, control a second I/O pin of an MCU to output a low level and a third I/O pin of the MCU to output a high level after pulling down a fifth I/O pin of the MCU, upon detecting a level change at a card presence detect pin of the card holder;

a first determining module, configured to determine whether an output level of a first contact of the card holder is a high level; if so, trigger a determining and enabling module;

the determining and enabling module is configured to determine whether the output level of the first contact of the card holder is a low level; if so, enable and reset a second timer, and trigger a second determining module;

the second determining module is configured to determine whether the output level of the first contact of the card holder is the high level; if so, trigger a determining and delaying module; otherwise, trigger a third determining module;

the third determining module is configured to determine whether a count of the second timer is less than a second preset duration; if so, trigger the second determining module; otherwise, trigger a first prompting module;

the first prompting module is configured to prompt that the fingerprint card is malfunctioning;

the determining and delaying module is configured to determine whether the count of the second timer is within a first preset range; if so, delay the second preset duration, and trigger a first detecting module; otherwise, trigger a fourth determining module;

a fourth determining module is configured to determine whether the count of the second timer is within a second preset range; if so, trigger the second determining module; otherwise, trigger the first prompting module;

the first detecting module is configured to detect the output level of the first contact of the card holder; if the output level of the first contact of the card holder is the low level, trigger a second prompting module; if the output level of the first contact of the card holder is the high level, trigger a third prompting module;

the second prompting module is configured to prompt that the fingerprint enrollment is successful;

the third prompting module is configured to prompt that the fingerprint enrollment is failed;

an initialing and setting module, configured to initialize a first timer, set an interrupt time to a first preset duration, and enable a timer interrupt; an interrupt processing module, configured to prompt a user to enroll a fingerprint when the first timer reaches the first preset duration.

In a fourth aspect, an embodiment of the present disclosure provides a system for implementing fingerprint enrollment, including a device and a fingerprint card; the device includes an MCU, a screen, a battery, a card power control module, and a card holder; a fifth I/O pin of the MCU is connected to a MOSFET of the card power control module, and the MOSFET of the card power control module is connected to a fourth contact of the card holder; a first I/O pin, a second I/O pin, a third I/O pin, and a fourth I/O pin of the MCU are respectively connected to a first contact, a second contact, a third contact and a card presence detect pin of the card holder; the first contact, the second contact, the third contact, the fourth contact, and a fifth contact of the card holder are respectively connected to a first pin, a second pin, a third pin, a fourth pin, and a fifth pin of a chip on the fingerprint card; where the device and the fingerprint card are configured to implement the above method for implementing fingerprint enrollment.

In a fifth aspect, an embodiment of the present disclosure provides an electronic device including at least one processor, a memory and instructions stored on the memory and executable by the at least one processor. The at least one processor executes the instructions to implement the above method for implementing fingerprint enrollment.

In a sixth aspect, an embodiment of the present disclosure provides a computer-readable storage medium including a computer program. When the computer program is run on an electronic device, the electronic device is enabled to execute the above method for implementing fingerprint enrollment.

In a seventh aspect, an embodiment of the present disclosure provides a chip system including a chip. The chip is coupled to a memory, and is configured to execute a computer program stored in the memory to perform the above method for implementing fingerprint enrollment.

Compared with the prior art, the present disclosure has the following advantages: the device in technical solutions of the present disclosure includes an MCU, a card holder and a display screen. The card holder is connected to a fingerprint card. The MCU determines a fingerprint enrollment progress of the fingerprint card by determining an output level of a first contact of the card holder, and prompts the fingerprint enrollment progress to the user using the display screen. The device of the present disclosure is configured to assist the fingerprint card in completing the fingerprint enrollment. The technical solutions in the present disclosure enable communication methods between the device and the fingerprint card to be unrestricted by communication protocols, thereby making these solutions convenient and simple to use.

BRIEF DESCRIPTION OF DRAWINGS

FIGS. 3A to 3E are flowcharts of a method for implementing fingerprint enrollment provided in a second embodiment of the present disclosure.

FIGS. 6A to 6D and 7A to 7C are flowcharts of a method for implementing fingerprint enrollment provided in a fourth embodiment of the present disclosure.

DETAILED DESCRIPTION OF EMBODIMENTS

The present disclosure proposes a method, an apparatus and a system for implementing fingerprint enrollment. Specific implementations of the present disclosure will be described in detail below with reference to accompanying drawings. An example of the embodiment is shown in the accompanying drawings. Embodiments described below with reference to the accompanying drawings are exemplary and are only used to explain the present disclosure, and cannot be interpreted as limiting the present disclosure.

Those skilled in the art can understand that, unless otherwise defined, all terms used here (including technical and scientific terms) have the same meaning as those generally understood by ordinary technicians in the art to which the present disclosure belongs. It should also be understood that terms such as those defined in general dictionaries should be understood to have meanings consistent with those in the context of the prior, and unless specifically defined as here, they will not be interpreted with idealized or overly formal meanings.

In order to clarify purposes, technical solutions and advantages of the present disclosure, a further detailed description of the implementations of the present disclosure will be provided below in conjunction with the accompanying drawings.

Figure 1:
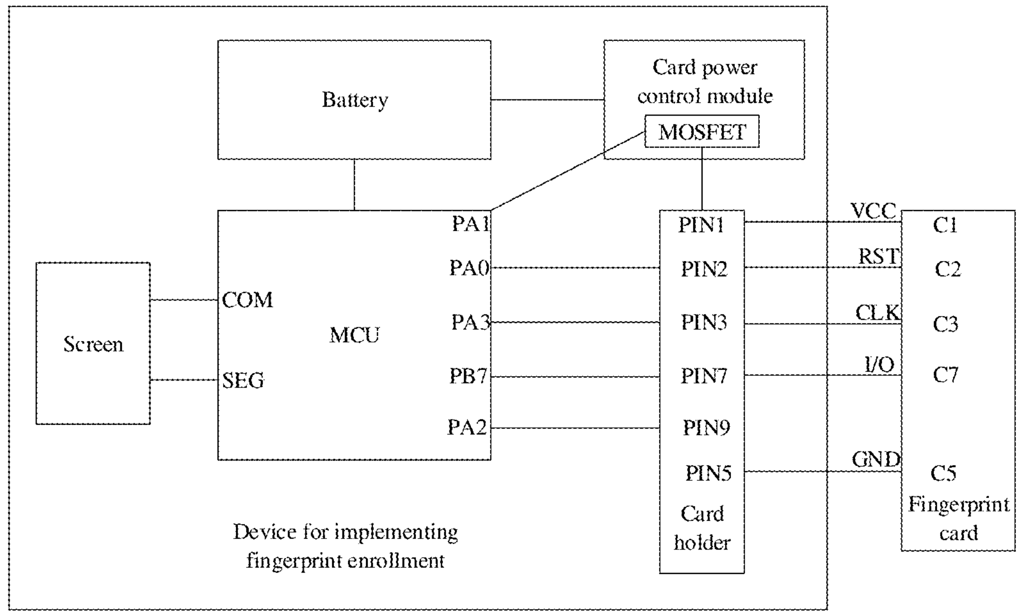
FIG. 1 is a schematic diagram of a device for implementing fingerprint enrollment provided in an embodiment of the present disclosure.

In the embodiments of the present disclosure, a device for implementing fingerprint enrollment is shown in FIG. 1. The device includes a screen, a microcontroller Unit (MCU), a battery, a card power control module, and a card holder. The battery is connected to the MCU and the card power control module, drive pins (SEG, COM) of the MCU are connected to the screen, a fifth I/O pin (PA1) of the MCU is connected to a MOSFET of the card power control module, and the MOSFET of the card power control module is connected to a fourth contact (PIN1) of the card holder, a first I/O pin (PB7), a second I/O pin (PA0), a third I/O pin (PA3), and a fourth I/O pin (PA2) of the MCU are respectively connected to a first contact (PIN7), a second contact (PIN2), a third contact (PIN3), and a card presence detect pin (PIN9) of the card holder, and the first contact (PIN7), the second contact (PIN2), the third contact (PIN3), the fourth contact (PIN1) and a fifth contact (PIN5) are respectively connected to a first pin (C7), a second pin (C2), a third pin (C3), a fourth pin (C1), and a fifth pin (C5) of a chip on the fingerprint card.

First Embodiment

Figure 2A:
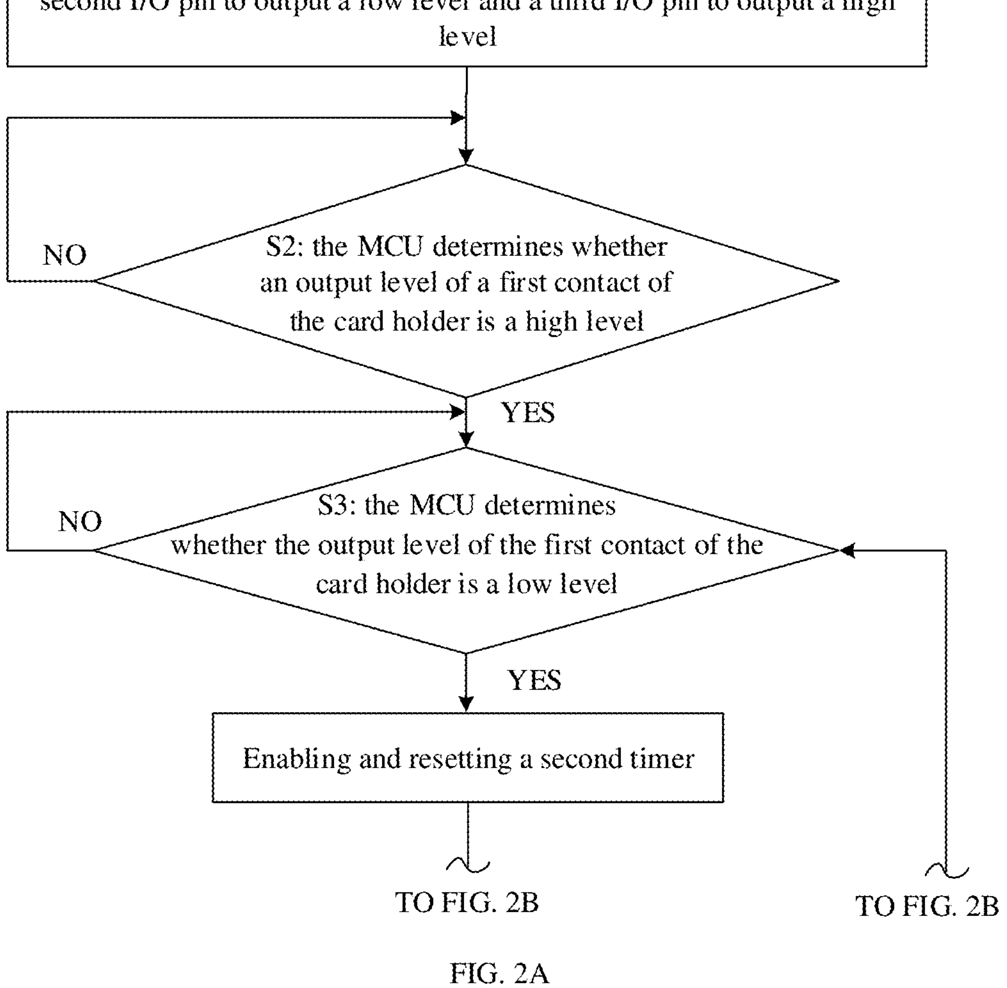
FIGS. 2A and 2B are flowcharts of a method for implementing fingerprint enrollment provided in a first embodiment of the present disclosure.
Figure 2B:
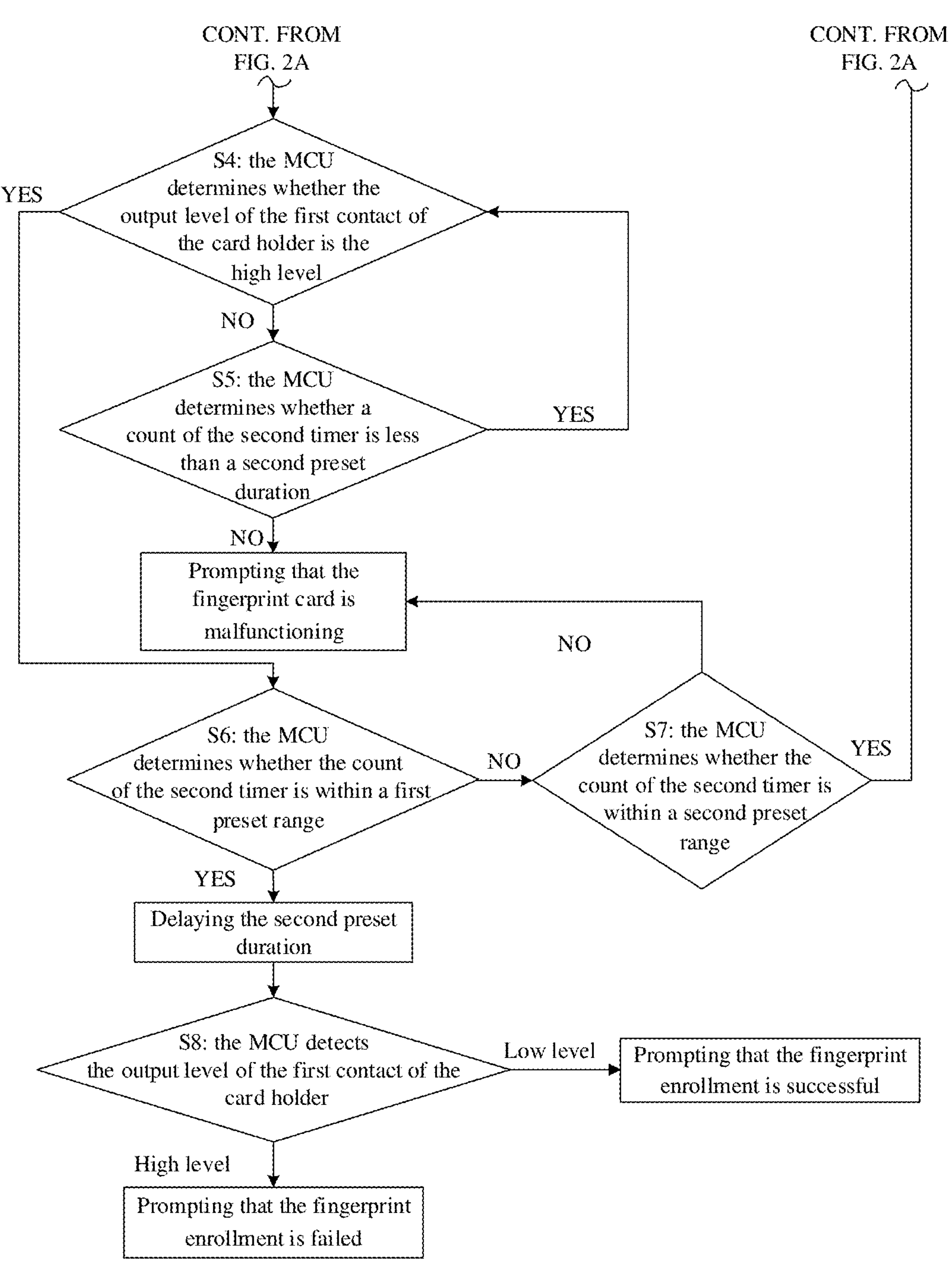
Figure 3B:
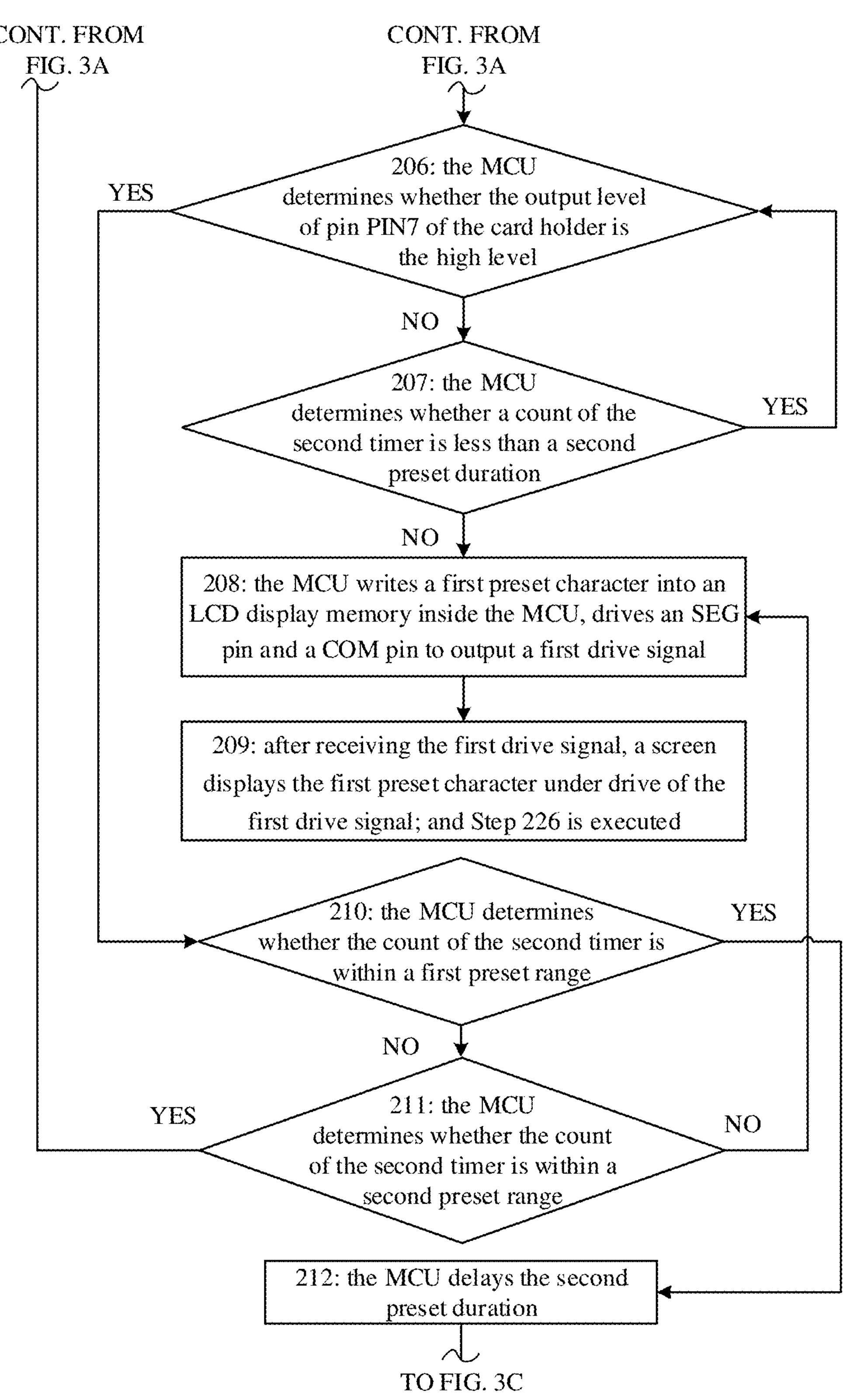
Figure 3C:
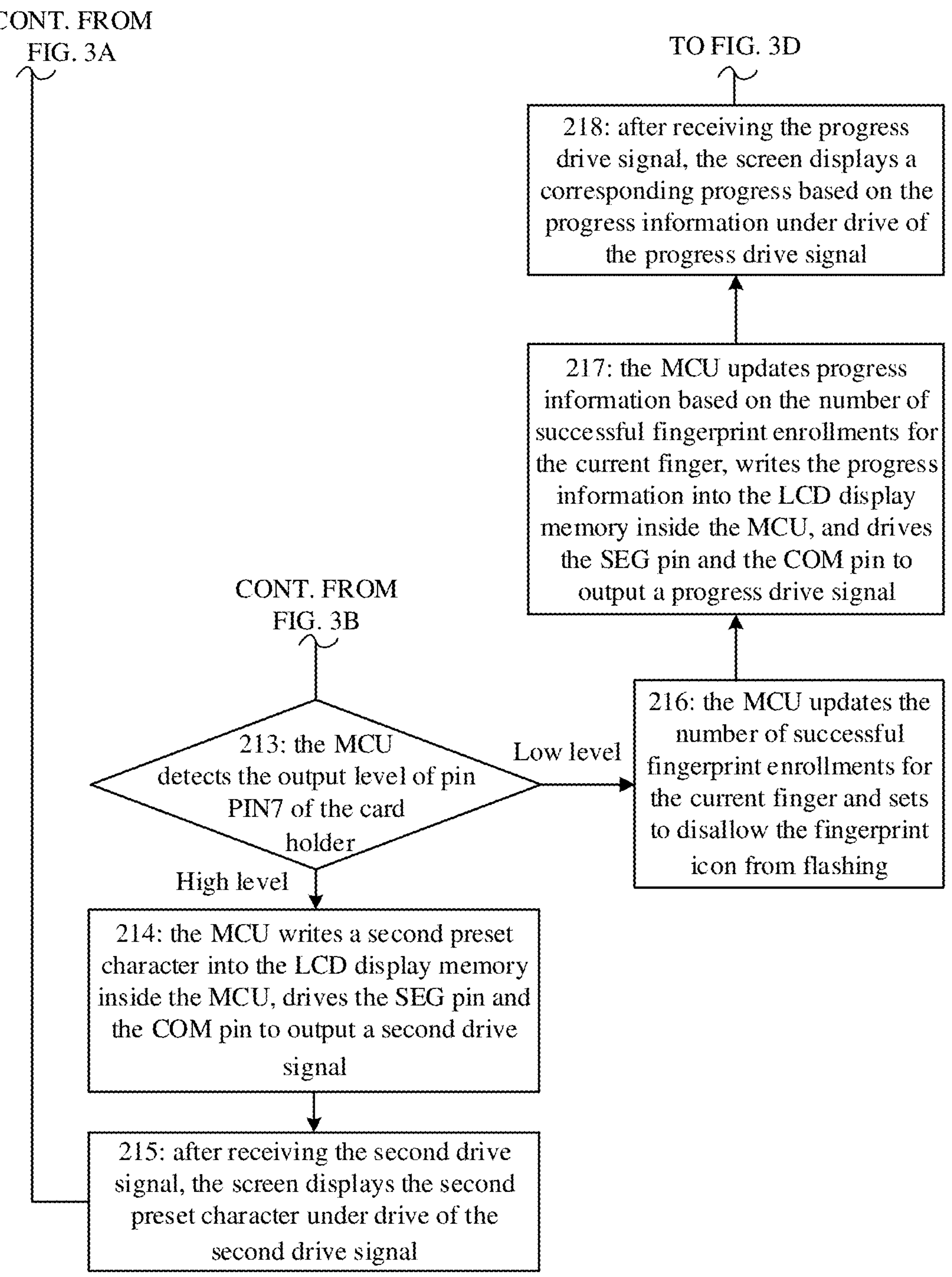
Figure 3D:
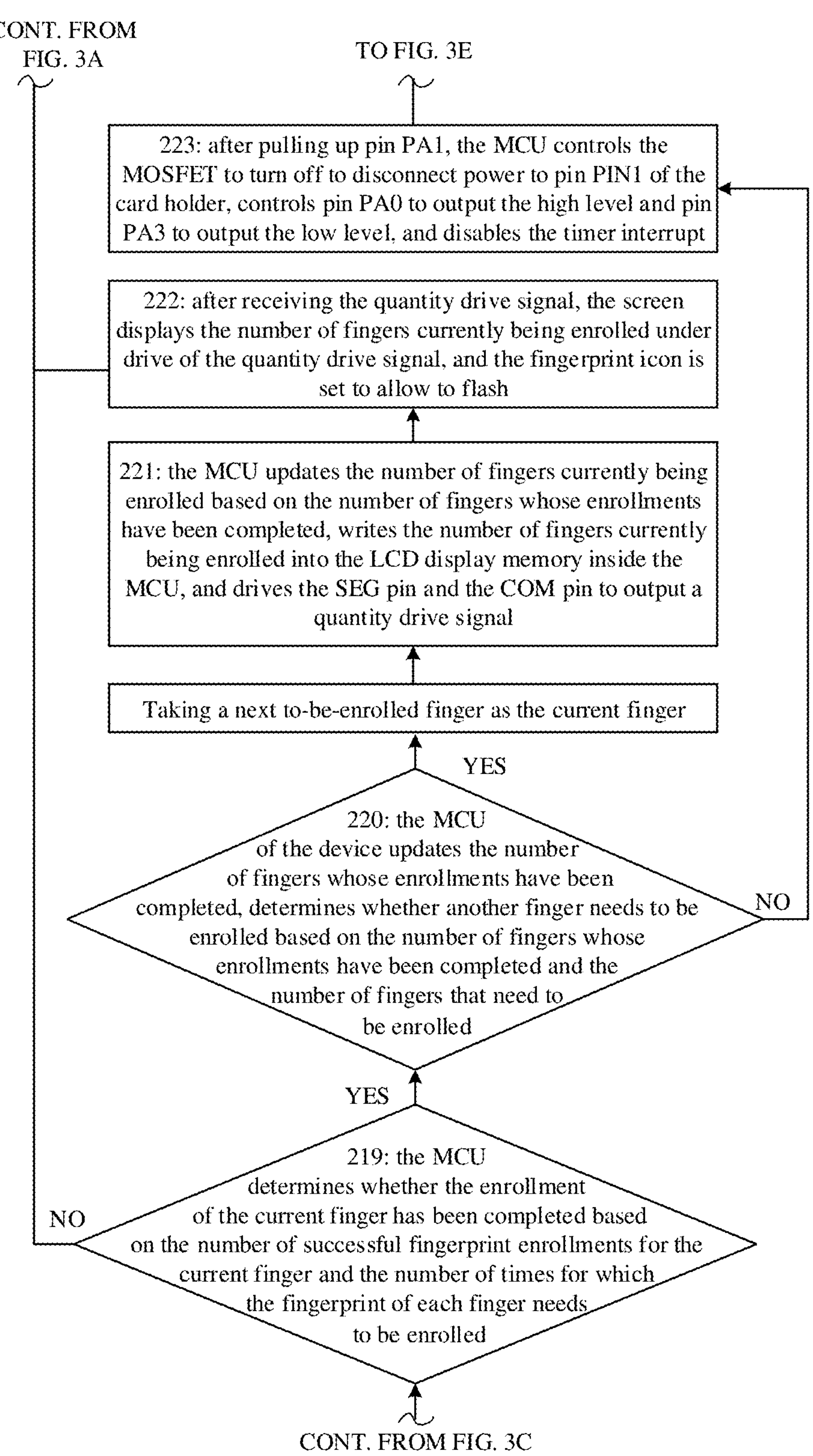

The first embodiment of the present disclosure provides a method for implementing fingerprint enrollment, as shown in FIGS. 2A and 2B, the method includes:

Step S1: upon detecting a level change at a card presence detect pin of a card holder, an MCU pulls down a fifth I/O pin, controls a MOSFET to turn on to supply power to a fourth contact of a card holder, and controls a second I/O pin to output a low level and a third I/O pin to output a high level;

Step S2: the MCU determines whether an output level of a first contact of the card holder is a high level; if so, the MCU executes Step S3; otherwise, the method returns to Step S2;

Step S3: the MCU determines whether the output level of the first contact of the card holder is a low level; if so, the MCU enables and resets a second timer, and executes Step S4; otherwise, the method returns to Step S3;

Step S4: the MCU determines whether the output level of the first contact of the card holder is the high level; if so, the MCU executes Step S6; otherwise, the MCU executes Step S5;

Step S5: the MCU determines whether a count of the second timer is less than a second preset duration; if so, the method returns to Step S4; otherwise, prompting that a fingerprint card is malfunctioning.

Specifically, in this embodiment, the prompting that the fingerprint card is malfunctioning includes:

the MCU writing a first preset character into a display memory inside the MCU, and driving a drive pin to output a first drive signal;

in an implementation, the display memory in this embodiment can be an LCD display memory.

after receiving the first drive signal, the screen displaying the first preset character under drive of the first drive signal.

Step S6: the MCU determines whether the count of the second timer is within a first preset range; if so, the MCU delays the second preset duration and executes Step S8; otherwise, the MCU executes Step S7.

Step S7: the MCU determines whether the count of the second timer is within a second preset range; if so, the method returns to the Step S3; otherwise, prompting that the fingerprint card is malfunctioning.

Step S8: the MCU detects the output level of the first contact of the card holder; if it is the low level, prompting that the fingerprint enrollment is successful; if it is the high level, prompting that the fingerprint enrollment is failed.

In an implementation, if the fingerprint enrollment is failed, the fingerprint can be enrolled again. And the method returns to Step S2 after it is prompted that the fingerprint enrollment is failed in Step S8.

Specifically, in this embodiment, the prompting that the fingerprint enrollment is failed includes:

the MCU writing a second preset character into the display memory inside the MCU, driving the drive pin to output a second drive signal;

after receiving the second drive signal, the screen displaying the second preset character under drive of the second drive signal;

the prompting that the fingerprint enrollment is successful includes: the MCU writing the number of successful fingerprint enrollments and a third preset character into the display memory inside the MCU, and driving the drive pin to output a third drive signal;

after receiving the third drive signal, the screen displaying the number of successful fingerprint enrollments and the third preset character under drive of the third drive signal.

In this embodiment, between the Step S1 and Step S2, the method includes: the MCU initializing a first timer, setting an interrupt time to a first preset duration, and enabling a timer interrupt.

The method further includes: entering a timer interrupt processing when the first timer reaches the first preset duration, where the timer interrupt processing includes prompting a user to enroll his fingerprint.

In an implementation, the method of this embodiment can also achieve multiple enrollments of the fingerprint for the same finger and/or the fingerprint enrollments of multiple fingers, that is, between the Step S1 and Step S2, the method includes: the MCU initializing the number of times for which a fingerprint of each finger needs to be enrolled and/or the number of fingers that needs to be enrolled.

In Step S8, before prompting that the fingerprint enrollment is successful, the method further includes: enrolling a fingerprint of a current finger multiple times and/or enrolling fingerprints of multiple fingers.

Enrolling a fingerprint of a current finger multiple times specifically includes the followings.

Step P1: the MCU updates the number of successful fingerprint enrollments for the current finger and prompts an enrollment progress.

Specifically, in this embodiment, prompting the enrollment progress includes:

the MCU updating progress information based on the number of successful fingerprint enrollments for the current finger, writing the progress information into the display memory inside the MCU, and driving the drive pin to output a progress drive signal;

after receiving the progress drive signal, the screen displaying a fingerprint enrollment progress based on the progress information under drive of the progress drive signal.

Step P2: the MCU determines whether the enrollment of the current finger has been completed based on the number of successful fingerprint enrollments for the current finger and the number of times for which the fingerprint of each finger needs to be enrolled; if so, the enrollment for the current finger has been completed; otherwise, the method returns to the Step S2.

The enrolling fingerprints of multiple fingers includes:

Step Q1: after the enrollment of the current finger has been completed, the MCU updates the number of fingers whose enrollments have been completed, determines whether another finger needs to be enrolled based on the number of fingers whose enrollments have been completed and the number of fingers that need to be enrolled; if so, takes a next to-be-enrolled finger as the current finger, and executes Step Q2; otherwise, executes Step Q3;

Step Q2: the MCU prompts the number of fingers currently being enrolled, and the method returns to Step S2.

Specifically, in this embodiment, Step Q2 includes:

Step Q21: the MCU updates the number of fingers currently being enrolled based on the number of fingers whose enrollments have been completed, writes the number of fingers currently being enrolled into the display memory inside the MCU, and driving the drive pin to output a quantity drive signal;

Step Q22: after receiving the quantity drive signal, the screen displays the number of fingers currently being enrolled under drive of the quantity drive signal, and the method returns to Step S2.

Step Q3: after pulling up the fifth I/O pin, the MCU controls the MOSFET to turn off to disconnect power to the fourth contact of the card holder, controls the second I/O pin to output the high level and the third I/O pin to output the low level.

Furthermore, between the Step S1 and Step S2, the method further includes: the MCU setting to allow a fingerprint icon and a numeric icon to flash, and setting to allow the fingerprint icon and the numeric icon to be displayed.

The prompting the user to enroll his fingerprint includes:

Step A1: the MCU determines whether the fingerprint icon is allowed to flash; if so, the MCU executes Step A2; otherwise, the MCU executes Step A7;

Step A2: the MCU determines whether the fingerprint icon is allowed to be displayed; if so, the MCU executes Step A3; otherwise, the MCU executes Step A5;

Step A3: the MCU writes the fingerprint icon into the display memory inside the MCU, and drives the drive pin to output a fingerprint drive signal;

Step A4: after receiving the fingerprint drive signal, the screen displays the fingerprint icon under drive of the fingerprint drive signal, and Step A7 is executed;

Step A5: the MCU clears the fingerprint icon in the display memory inside the MCU and drives the drive pin to output a clearing drive signal;

Step A6: after receiving the clearing drive signal, the screen clears the displayed fingerprint icon under drive of the clearing drive signal, and Step A7 is executed;

Step A7: the MCU determines whether the numeric icon is allowed to flash; if so, the MCU executes Step A8; otherwise, exiting the timer interrupt;

Step A8: the MCU determines whether the numeric icon is allowed to be displayed; if so, the MCU executes Step A9; otherwise, the MCU executes Step A11;

Step A9: the MCU writes the numeric icon indicating the number of fingers currently being enrolled into the display memory inside the MCU, and drives the drive pin to output a numeric drive signal;

Step A10: after receiving the numeric drive signal, the screen displays the numeric icon under drive of the numeric drive signal, and the timer interrupt is exited;

Step A11: the MCU clears the numeric icon in the display memory inside the MCU and drives the drive pin to output the clearing drive signal;

Step A12: after receiving the clearing drive signal, the screen clears the displayed numeric icon under drive of the clearing drive signal, and the timer interrupt is exited.

When enrolling the fingerprint of each finger multiple times and enrolling the fingerprints of the multiple fingers, the Step P1 further includes: setting to disallow the fingerprint icon from flashing;

the Step Q2 further includes: setting to allow the fingerprint icon to flash;

the Step Q3 further includes: disabling the timer interrupt.

In this embodiment, after prompting that the fingerprint card is malfunctioning and/or prompting that the fingerprint enrollment is successful, the method further includes:

Step D1: the MCU enables a third timer, and drives the drive pin to output a clearing drive signal when a count of the third timer reaches a third preset duration;

Step D2: after receiving the clearing drive signal, the screen clears the displayed content under drive of the clearing drive signal, and returns a success signal to the MCU after the clearing is completed;

Step D3: after receiving the success signal, the MCU executes a sleep command to enable the device to enter a sleep state after the MCU executes the sleep command.

The device in this embodiment includes an MCU, a card holder and a display screen. The card holder is connected to a fingerprint card. The MCU determines a fingerprint enrollment progress of the fingerprint card by determining an output level of a first contact of the card holder, and prompts the fingerprint enrollment progress to the user using the display screen. The device in this embodiment is configured to assist the fingerprint card in completing the fingerprint enrollment. The technical solutions in the present disclosure enable communication methods between the device and the fingerprint card to be unrestricted by communication protocols, thereby making these solutions convenient and simple to use.

Second Embodiment

The second embodiment of the present disclosure provides a method for implementing fingerprint enrollment, as shown in FIGS. 3A to 3E, the method includes:

Step 201: upon detecting a level change at pin PIN9 of a card holder, after pulling down pin PA1, an MCU controls a MOSFET to turn on to supply power to pin PIN1 of the card holder, and controls pin PA0 to output a low level and pin PA3 to output a high level;

Step 202: the MCU initializes a first timer, sets an interrupt time to a first preset duration, enables a timer interrupt, sets to allow a fingerprint icon and a numeric icon to flash, and sets to allow the fingerprint icon and the numeric icon to be displayed.

Specifically, in this embodiment, the setting to allow the fingerprint icon and the numeric icon to flash, and setting to allow the fingerprint icon and the numeric icon to be displayed includes: setting control switches for a fingerprint flashing icon, a numeric flashing icon, a fingerprint display icon, and a numeric display icon.

For example, the first preset duration is 600 ms (milliseconds).

Step 203: the MCU initializes the number of times for which a fingerprint of each finger needs to be enrolled and the number of fingers that need to be enrolled.

Step 204: the MCU determines whether the output level of pin PIN7 of the card holder is the high level; if so, the MCU executes Step 205; otherwise, the method returns to Step 204.

Step 205: the MCU determines whether the output level of pin PIN7 of the card holder is the low level; if so, the MCU enables and resets the second timer; executes Step 206; otherwise, the method returns to Step 205.

Step 206: the MCU determines whether the output level of pin PIN7 of the card holder is the high level; if so, the MCU executes Step 210; otherwise, the MCU executes Step 207.

Step 207: the MCU determines whether a count of the second timer is less than a second preset duration; if so, the method returns to Step 206; otherwise, the MCU executes Step 208.

For example, the second preset duration is 510 ms (milliseconds).

Step 208: the MCU writes a first preset character into an LCD display memory inside the MCU, drives an SEG pin and a COM pin to output a first drive signal.

Step 209: after receiving the first drive signal, a screen displays the first preset character under drive of the first drive signal, and Step 226 is executed.

For example, the first preset character in this embodiment is !, indicating that the fingerprint card is malfunctioning.

Step 210: the MCU determines whether the count of the second timer is within a first preset range; if so, the MCU executes Step 212; otherwise, the MCU executes Step 211.

For example, the first preset range in this embodiment is greater than or equal to 48 and less than or equal to 52.

Step 211: the MCU determines whether the count of the second timer is within a second preset range; if so, the method returns to Step 205; otherwise, the method returns to Step 208.

For example, the second preset range in this embodiment is greater than or equal to 490 and less than or equal to 510.

Step 212: the MCU delays the second preset duration, and executes Step 213.

For example, the second preset duration in this embodiment is 500 ms (milliseconds).

Step 213: the MCU detects the output level of pin PIN7 of the card holder; if it is the low level, the MCU executes Step 216; if it is the high level, the MCU executes Step 214.

Step 214: the MCU writes a second preset character into the LCD display memory inside the MCU, drives the SEG pin and the COM pin to output a second drive signal.

Step 215: after receiving the second drive signal, the screen displays the second preset character under drive of the second drive signal, and the method returns to Step 204.

For example, the second preset character in Step 215 is x, indicating that the fingerprint enrollment is failed.

Step 216: the MCU updates the number of successful fingerprint enrollments for the current finger and sets to disallow the fingerprint icon from flashing.

Specifically, in this embodiment, the setting to disallow the fingerprint icon from flashing includes: resetting a fingerprint icon indicator.

For example, if an initial value of the number of successful fingerprint enrollments for the current finger is 0, the updating of the number of successful fingerprint enrollments for the current finger by the MCU specifically includes: the MCU incrementing the number of successful fingerprint enrollments for the current finger by 1.

Step 217: the MCU updates progress information based on the number of successful fingerprint enrollments for the current finger, writes the progress information into the LCD display memory inside the MCU, and drives the SEG pin and the COM pin to output a progress drive signal.

Step 218: after receiving the progress drive signal, the screen displays a corresponding progress based on the progress information under drive of the progress drive signal, and Step 219 is executed.

Step 219: the MCU determines whether the enrollment of the current finger has been completed based on the number of successful fingerprint enrollments for the current finger and the number of times for which the fingerprint of each finger needs to be enrolled; if so, the MCU executes Step 220; otherwise, the method returns to Step 204.

In this embodiment, the Step 219 includes: the MCU determining whether the number of successful fingerprint enrollments for the current finger is the number of times for which the fingerprint of each finger needs to be enrolled; if so, it is determined that the enrollment of the current finger has been completed, and the MCU executing Step 220; otherwise, it is determined that the enrollment of the current finger has not been completed, the method returns to Step 204.

Step 220: the MCU of the device updates the number of fingers whose enrollments have been completed, determines whether another finger needs to be enrolled based on the number of fingers whose enrollments have been completed and the number of fingers that need to be enrolled; if so, the MCU takes a next to-be-enrolled finger as the current finger, and executes Step 221; otherwise, the MCU executes Step 223.

In an implementation, the initial value of the number of fingers whose enrollments have been completed is 0, and the updating of the number of fingers whose enrollments have been completed by the MCU specifically includes: the MCU incrementing the number of fingers whose enrollments have been completed by 1.

Specifically, in this embodiment, Step 220 includes: the MCU determining whether the number of fingers whose enrollments have been completed is equal to the number of fingers that need to be enrolled; if so, there is no other finger to be enrolled, and the MCU executing Step 223; otherwise, there is another finger that needs to be enrolled, and the MCU takes the next to-be-enrolled finger as the current finger, and executes Step 221.

Step 221: the MCU updates the number of fingers currently being enrolled based on the number of fingers whose enrollments have been completed, writes the number of fingers currently being enrolled into the LCD display memory inside the MCU, and drives the SEG pin and the COM pin to output a quantity drive signal.

Specifically, in this embodiment, the updating of the number of fingers currently being enrolled based on the number of fingers whose enrollments have been completed includes: adding 1 to the number of fingers whose enrollments have been completed to obtain the number of fingers currently being enrolled.

Step 222: after receiving the quantity drive signal, the screen displays the number of fingers currently being enrolled under drive of the quantity drive signal, and the fingerprint icon is set to allow to flash, and the method returns to Step 204.

Step 223: after pulling up pin PA1, the MCU controls the MOSFET to turn off to disconnect power to pin PIN1 of the card holder, controls pin PA0 to output the high level and pin PA3 to output the low level, and disables the timer interrupt.

Step 224: the MCU writes the number of fingers whose enrollments have been completed and a third preset character into the LCD display memory inside the MCU, drives the SEG pin and the COM pin to output a third drive signal.

Step 225: after receiving the third drive signal, the screen displays the number of fingers whose enrollments have been completed and the third preset character under drive of the third drive signal, and executes Step 226.

For example, in this embodiment, the third preset character is "√", indicating that the fingerprint enrollment is successful.

Step 226: the MCU enables a third timer, and drives the SEG pin and the COM pin to output a clearing drive signal when the count of the third timer reaches a third preset duration.

For example, the third preset duration in this step is 30 seconds.

Step 227: after receiving the clearing drive signal, the screen clears the displayed content under drive of the clearing drive signal, and returns a success signal to the MCU after the clearing is completed.

Step 228: the MCU executes a sleep command after receiving the success signal, and enables the device to enter a sleep state.

Figure 4A:
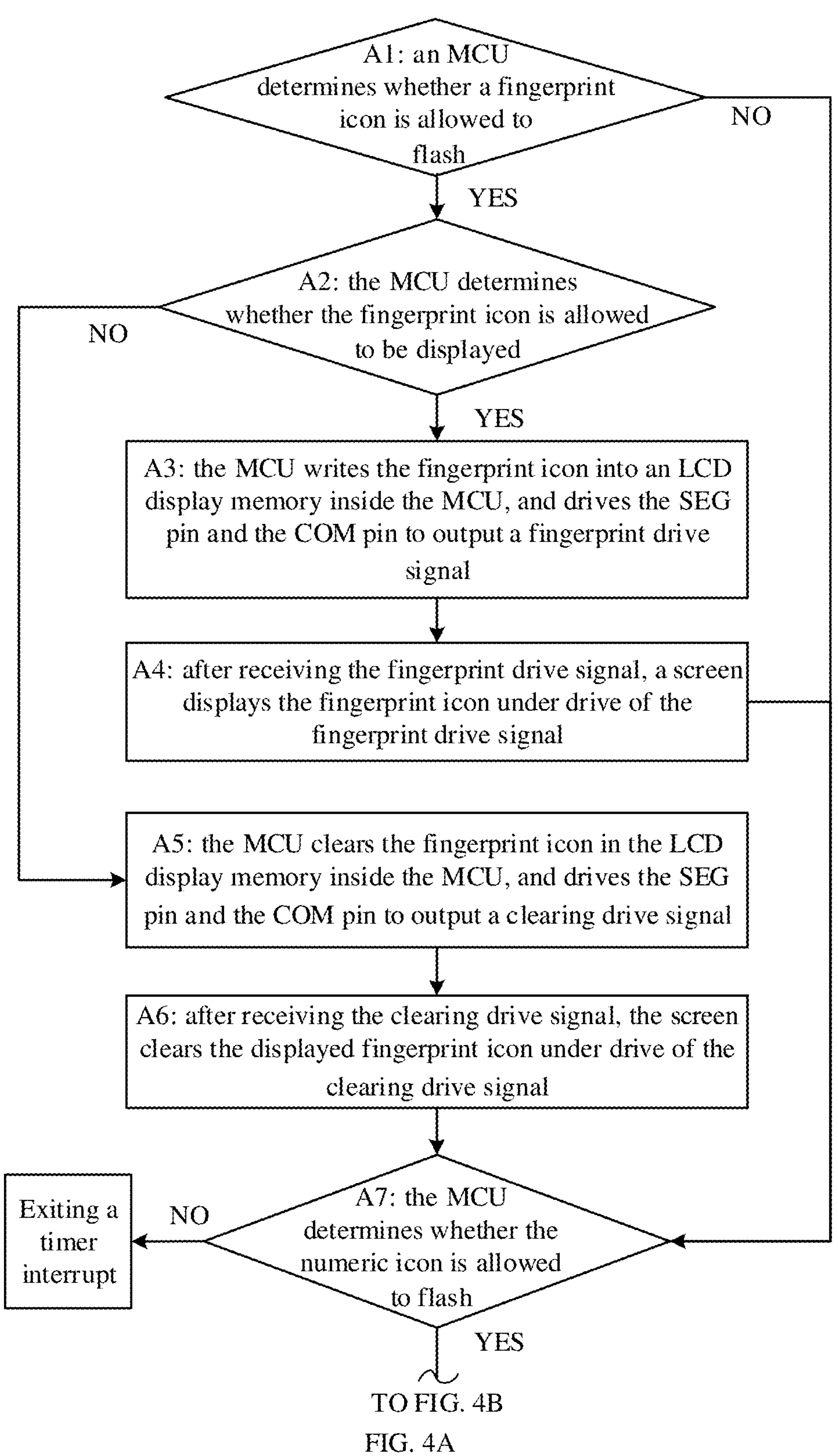
FIGS. 4A and 4B are flowcharts of an implementation process for entering a timer interrupt processing in the second embodiment of the present disclosure.
Figure 4B:
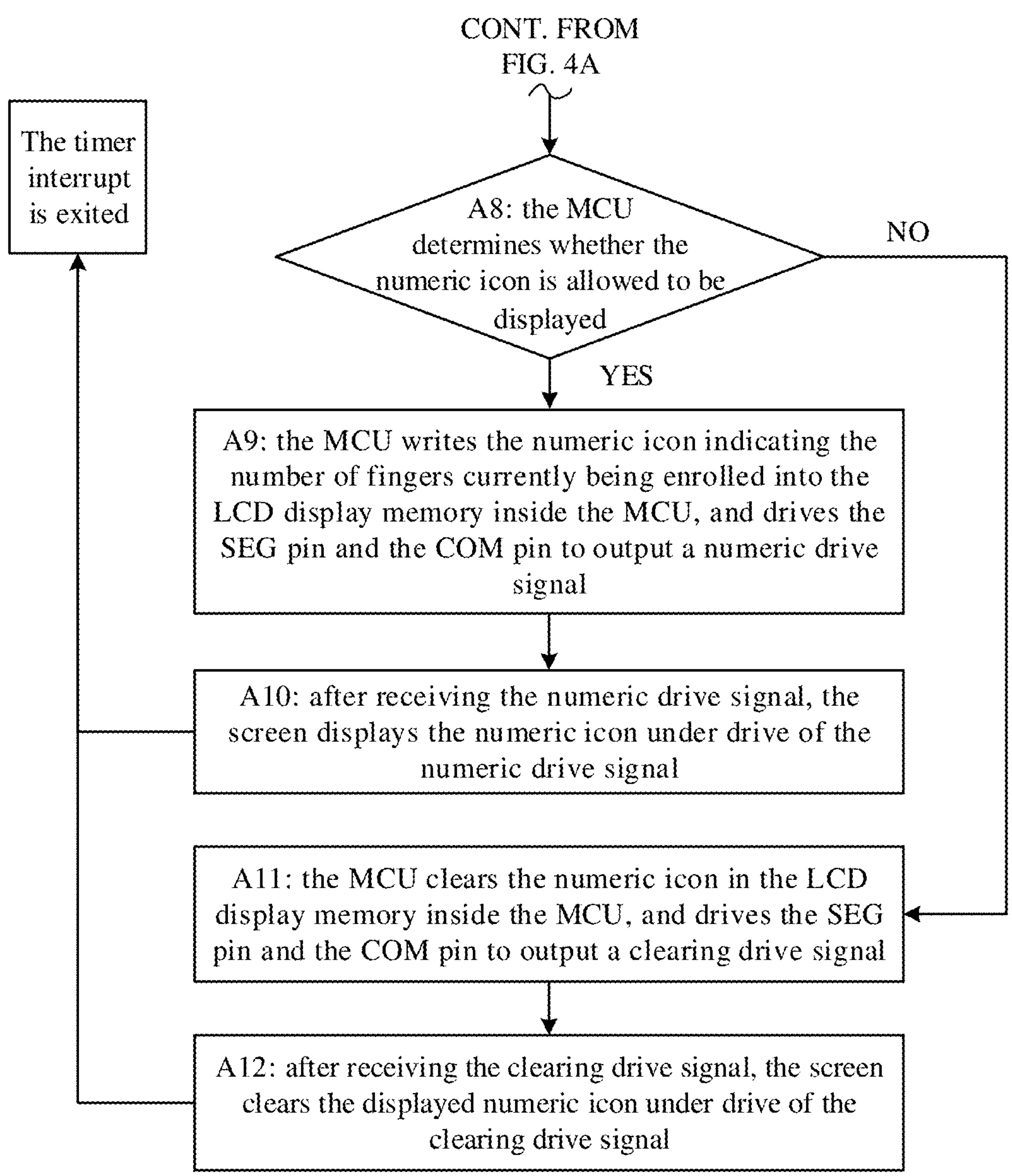

Specifically, in this embodiment, the entering of the timer interrupt processing when the first timer reaches the first preset duration, as shown in FIGS. 4A and 4B, includes:

Step A1: the MCU determines whether the fingerprint icon is allowed to flash; if so, the MCU executes Step A2; otherwise, the MCU executes Step A7.

In this embodiment, Step A1 includes: the MCU determining whether a fingerprint flashing indicator is set; if so, the fingerprint icon is allowed to flash; otherwise, the fingerprint icon is not allowed to flash.

Step A2: the MCU determines whether the fingerprint icon is allowed to be displayed; if so, the MCU executes Step A3; otherwise, the MCU executes Step A5.

In this embodiment, Step A2 includes: the MCU determining whether a fingerprint display indicator is set; if so, the fingerprint icon is allowed to be displayed; otherwise, the fingerprint icon is not allowed to be displayed.

Step A3: the MCU writes the fingerprint icon into an LCD display memory inside the MCU, and drives the SEG pin and the COM pin to output a fingerprint drive signal.

Step A4: after receiving the fingerprint drive signal, a screen displays the fingerprint icon under drive of the fingerprint drive signal, and Step A7 is executed.

In this embodiment, after Step A4, the fingerprint icon is displayed on the screen and flashes, and 1 is displayed in an upper-left corner of the screen and flashes.

Step A5: the MCU clears the fingerprint icon in the LCD display memory inside the MCU, and drives the SEG pin and the COM pin to output a clearing drive signal.

Step A6: after receiving the clearing drive signal, the screen clears the displayed fingerprint icon under drive of the clearing drive signal, and Step A7 is executed.

Step A7: the MCU determines whether the numeric icon is allowed to flash; if so, the MCU executes Step A8; otherwise, the MCU exits the timer interrupt.

In this embodiment, Step A7 includes: the MCU determining whether a numeric flashing indicator is set; if so, the numeric icon is allowed to flash, otherwise, the numeric icon is not allowed to flash.

Step A8: the MCU determines whether the numeric icon is allowed to be displayed; if so, the MCU executes Step A9; otherwise, the MCU executes Step A11.

In this embodiment, Step A8 includes: the MCU determining whether a numeric display indicator is set; if so, the number is allowed to be displayed; otherwise, the number is not allowed to be displayed.

Step A9: the MCU writes the numeric icon indicating the number of fingers currently being enrolled into the LCD display memory inside the MCU, and drives the SEG pin and the COM pin to output a numeric drive signal.

Step A10: after receiving the numeric drive signal, the screen displays the numeric icon under drive of the numeric drive signal, and the timer interrupt is exited.

Step A11: the MCU clears the numeric icon in the LCD display memory inside the MCU, and drives the SEG pin and the COM pin to output a clearing drive signal.

Step A12: after receiving the clearing drive signal, the screen clears the displayed numeric icon under drive of the clearing drive signal, and the timer interrupt is exited.

Third Embodiment

Figure 5A:
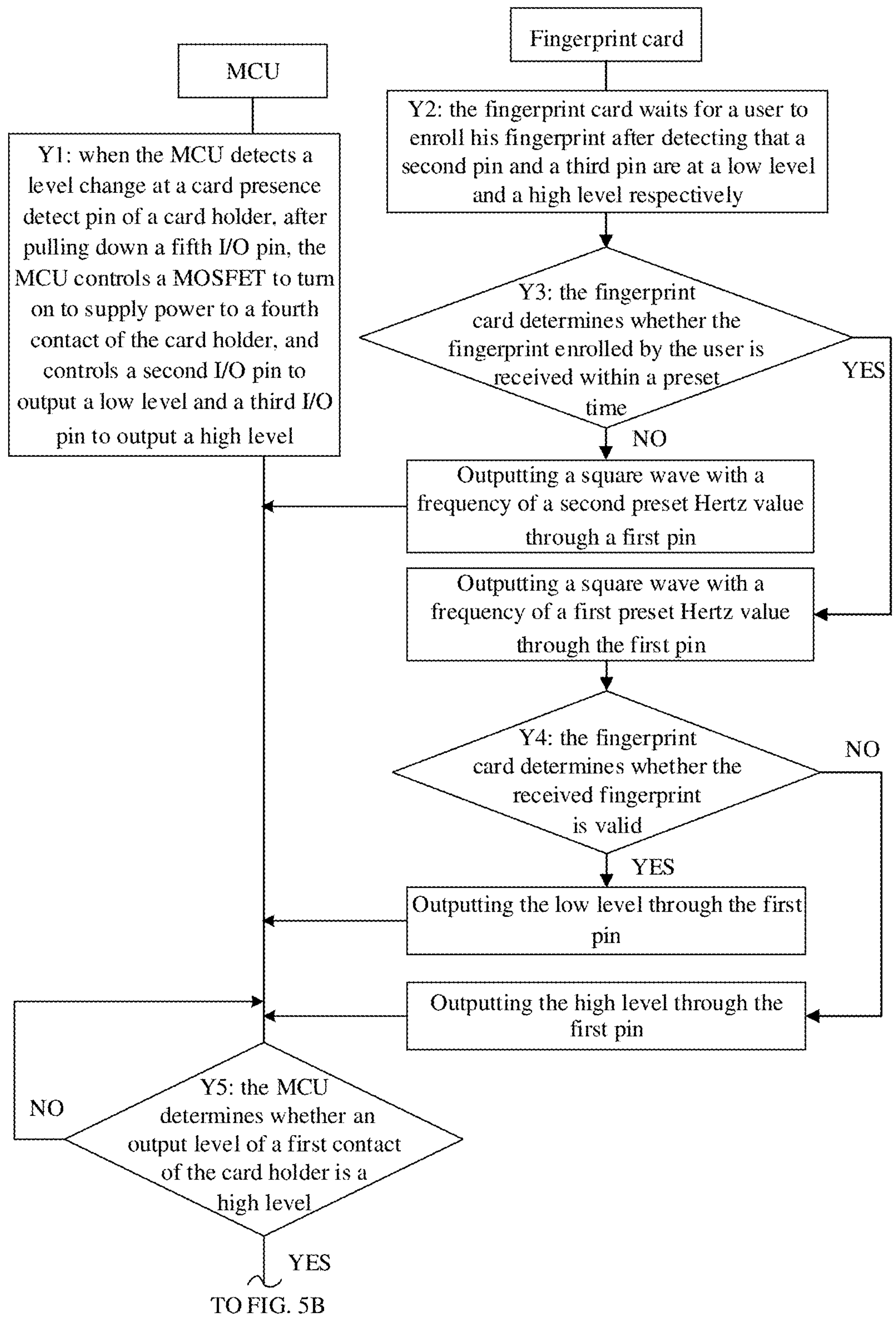
FIGS. 5A to 5C are flowcharts of a method for implementing fingerprint enrollment provided in a third embodiment of the present disclosure.
Figure 5B:
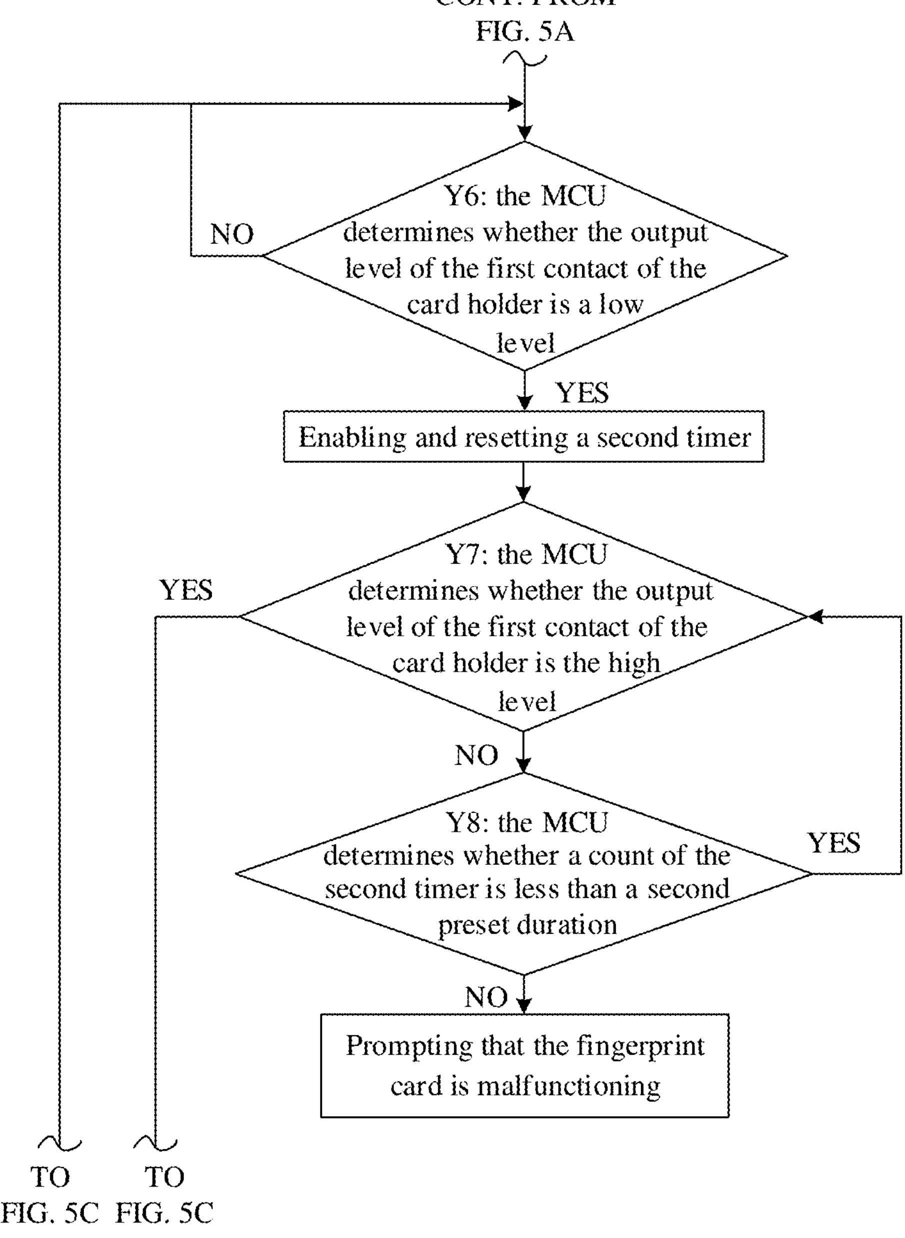
Figure 5C:
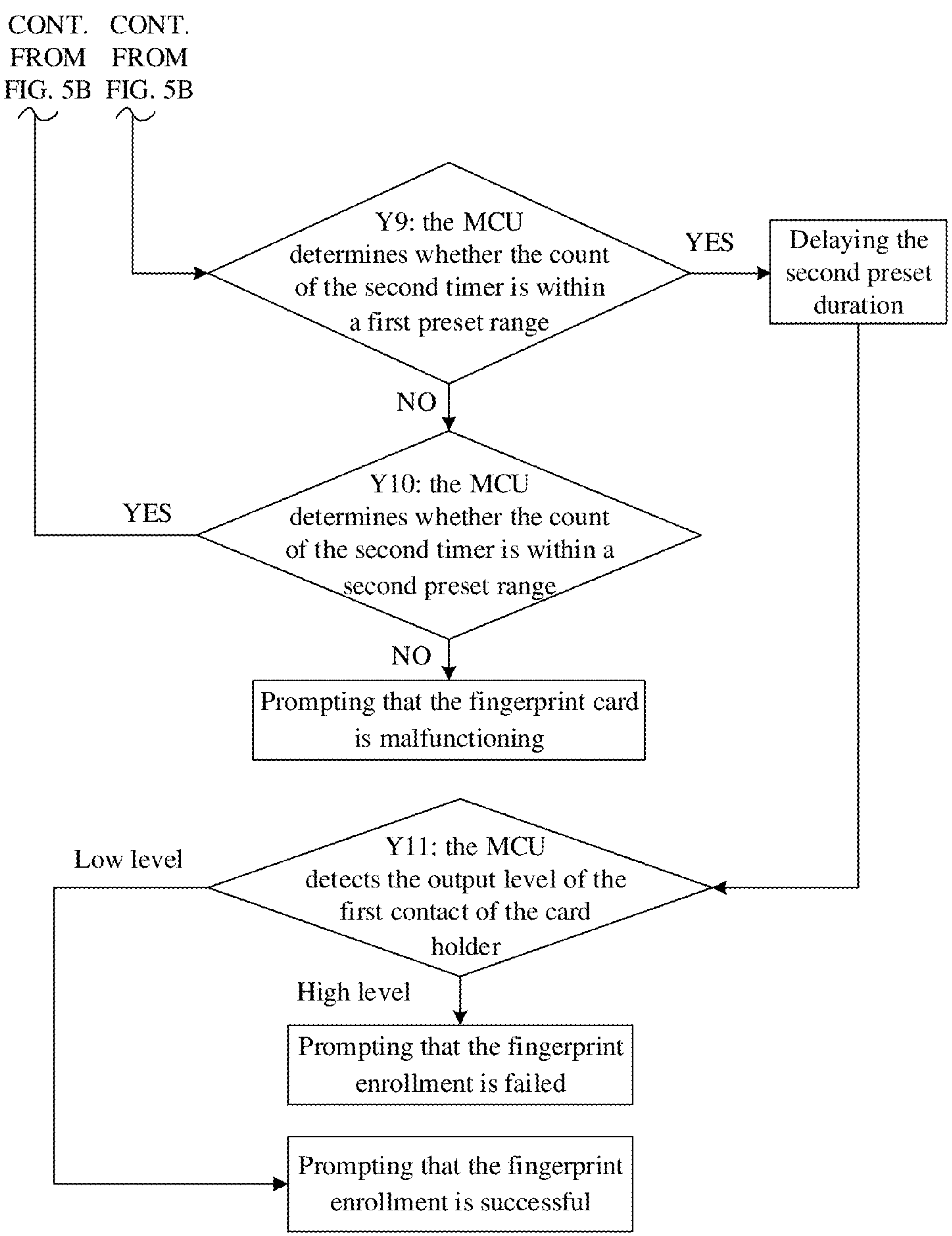
Figure 6A:
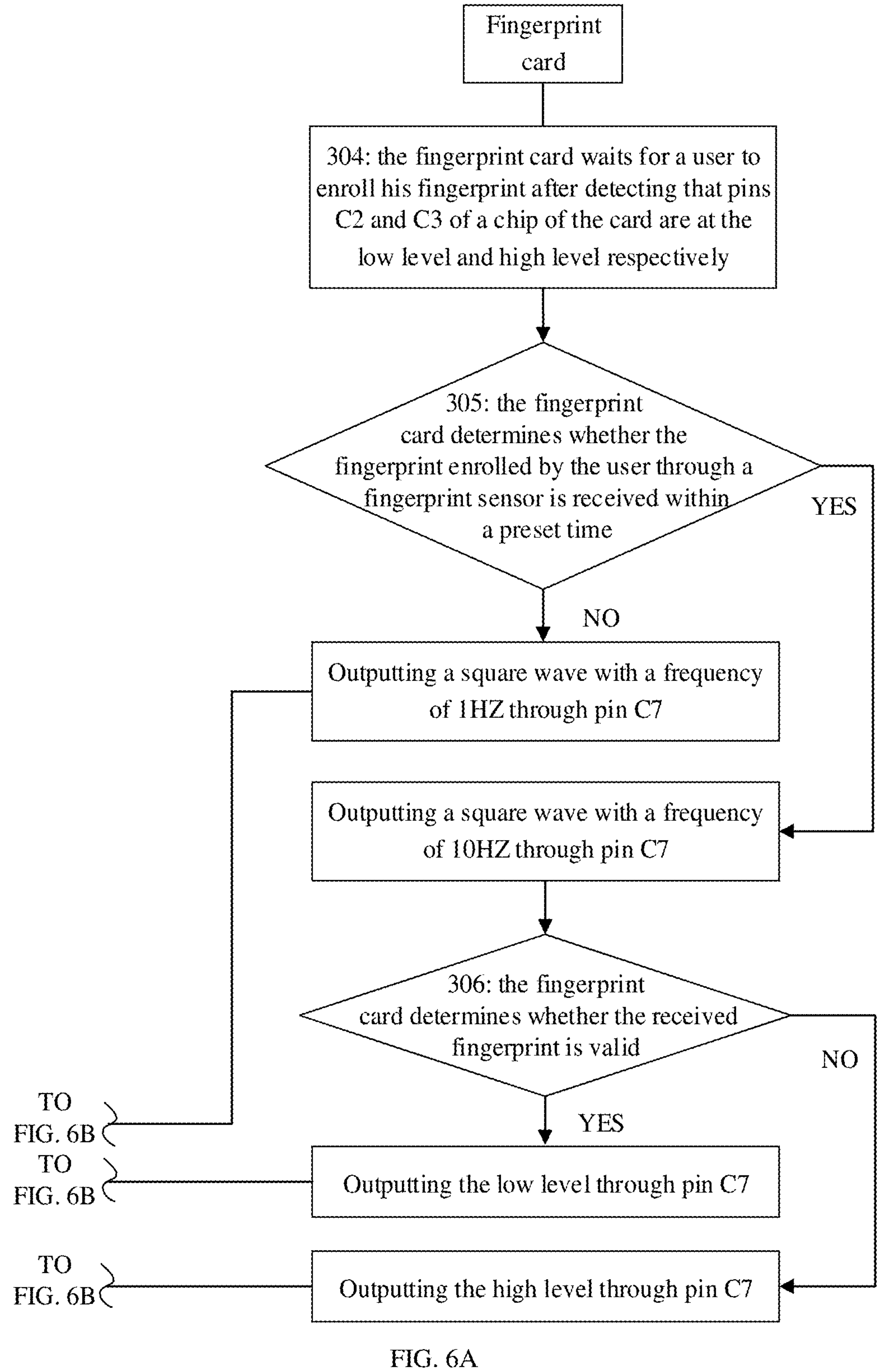
Figure 6C:
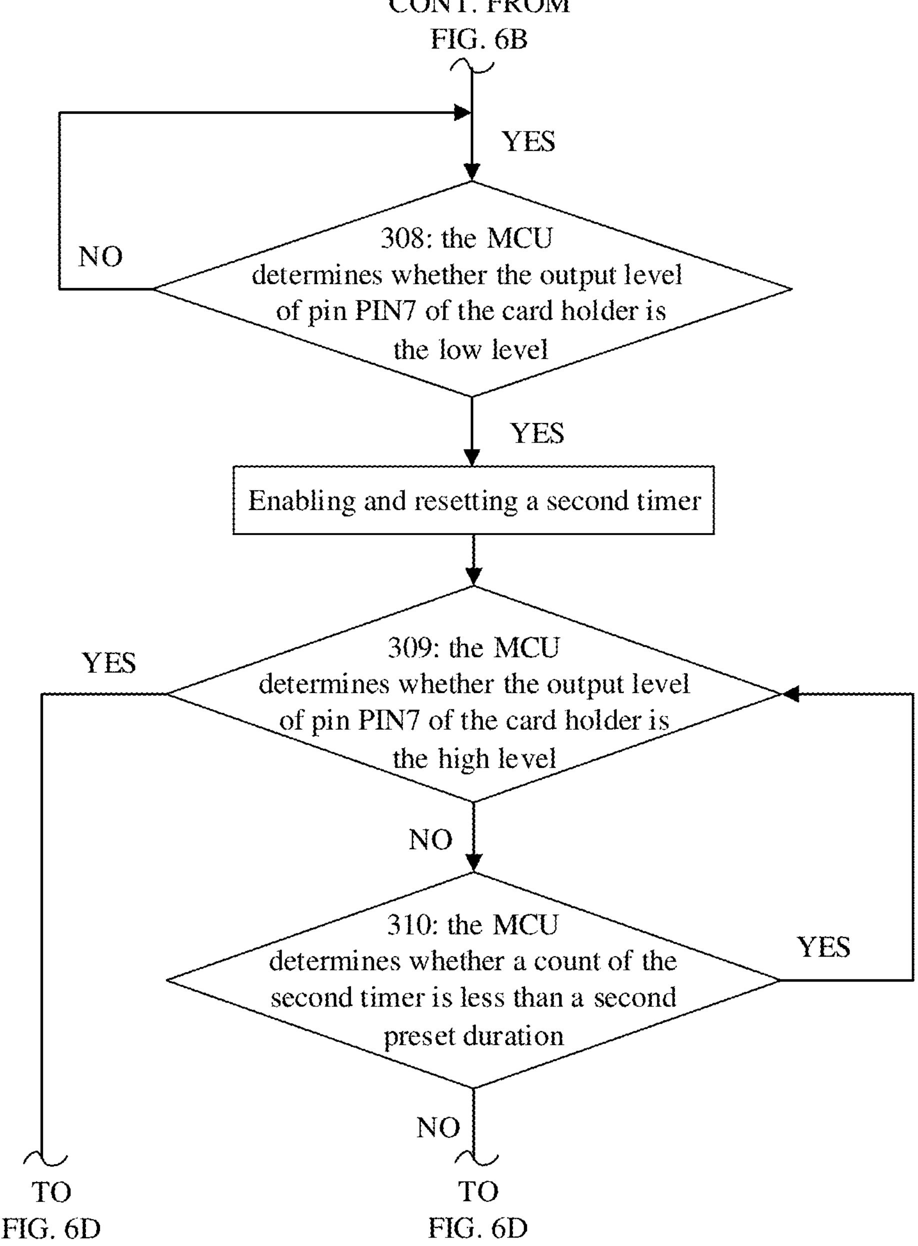
Figure 6D:
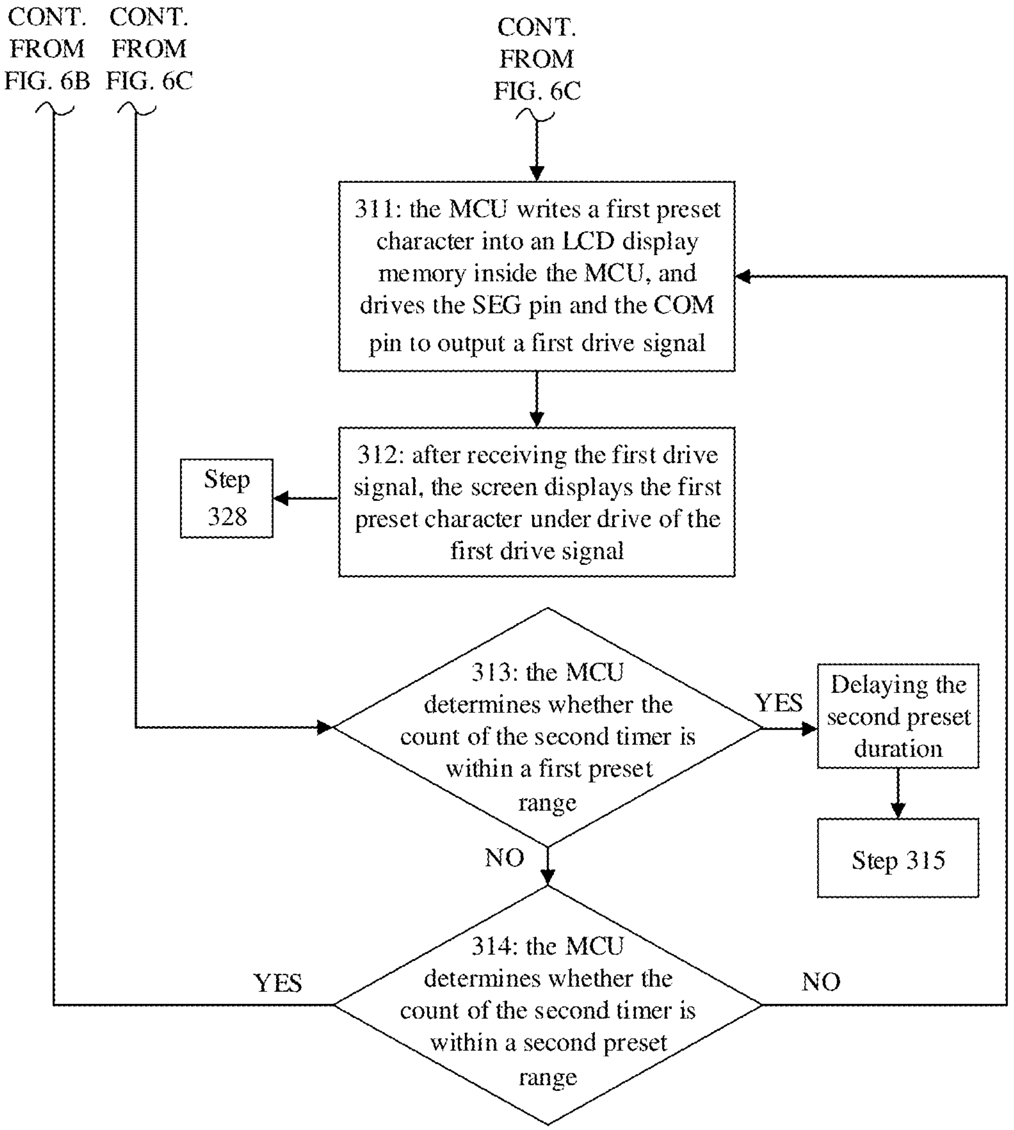
Figure 7A:
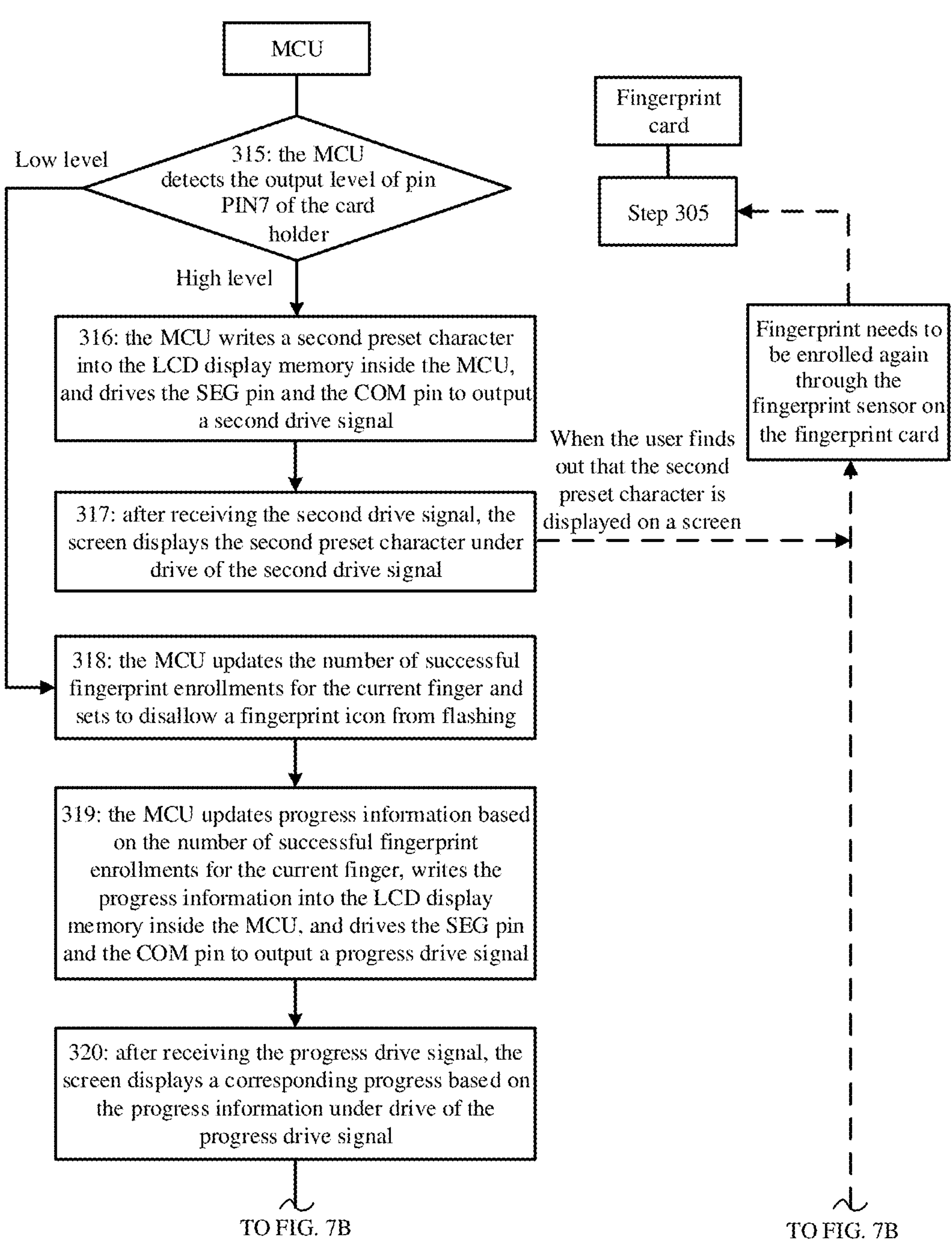
Figure 7B:
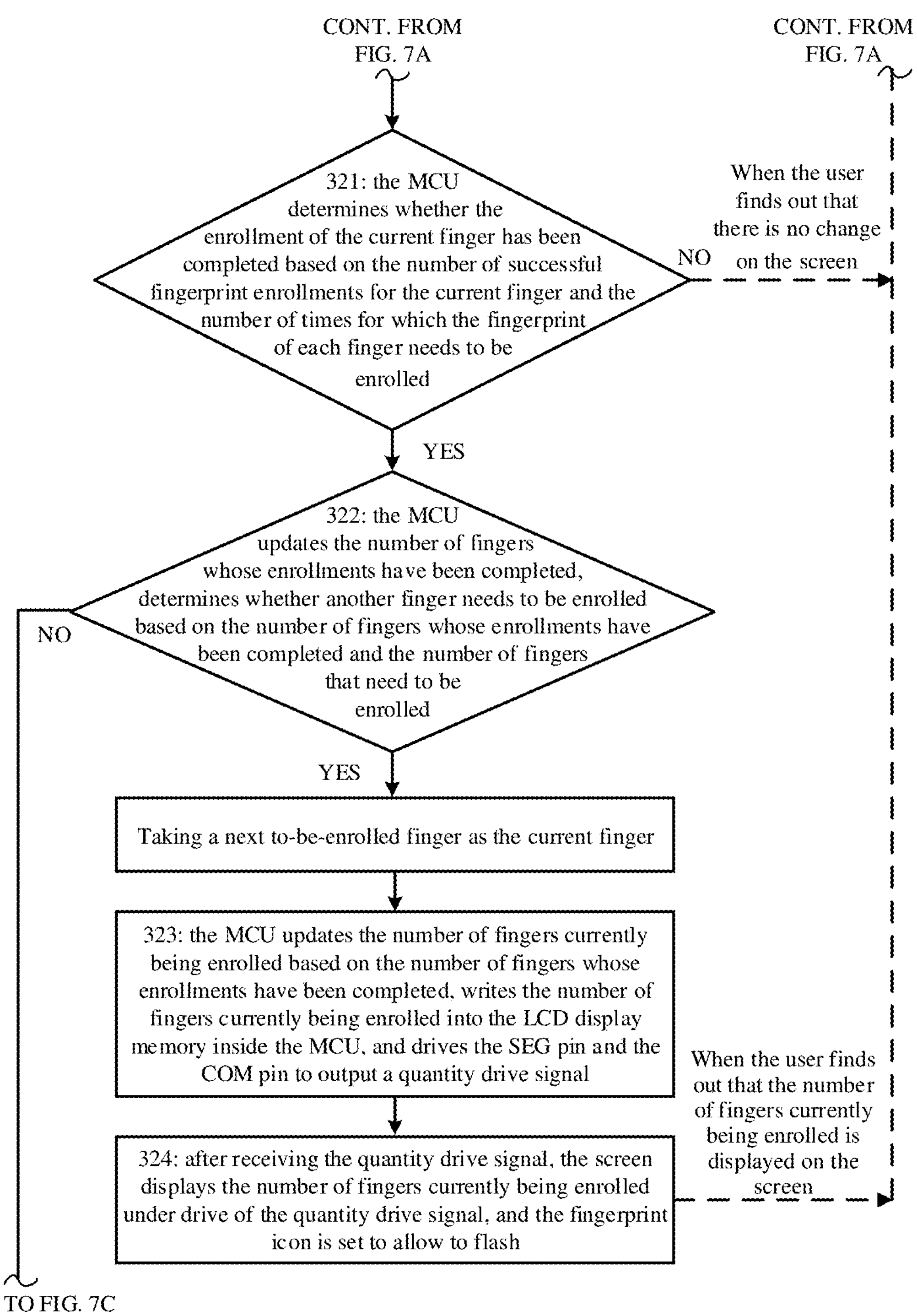
Figure 7C:
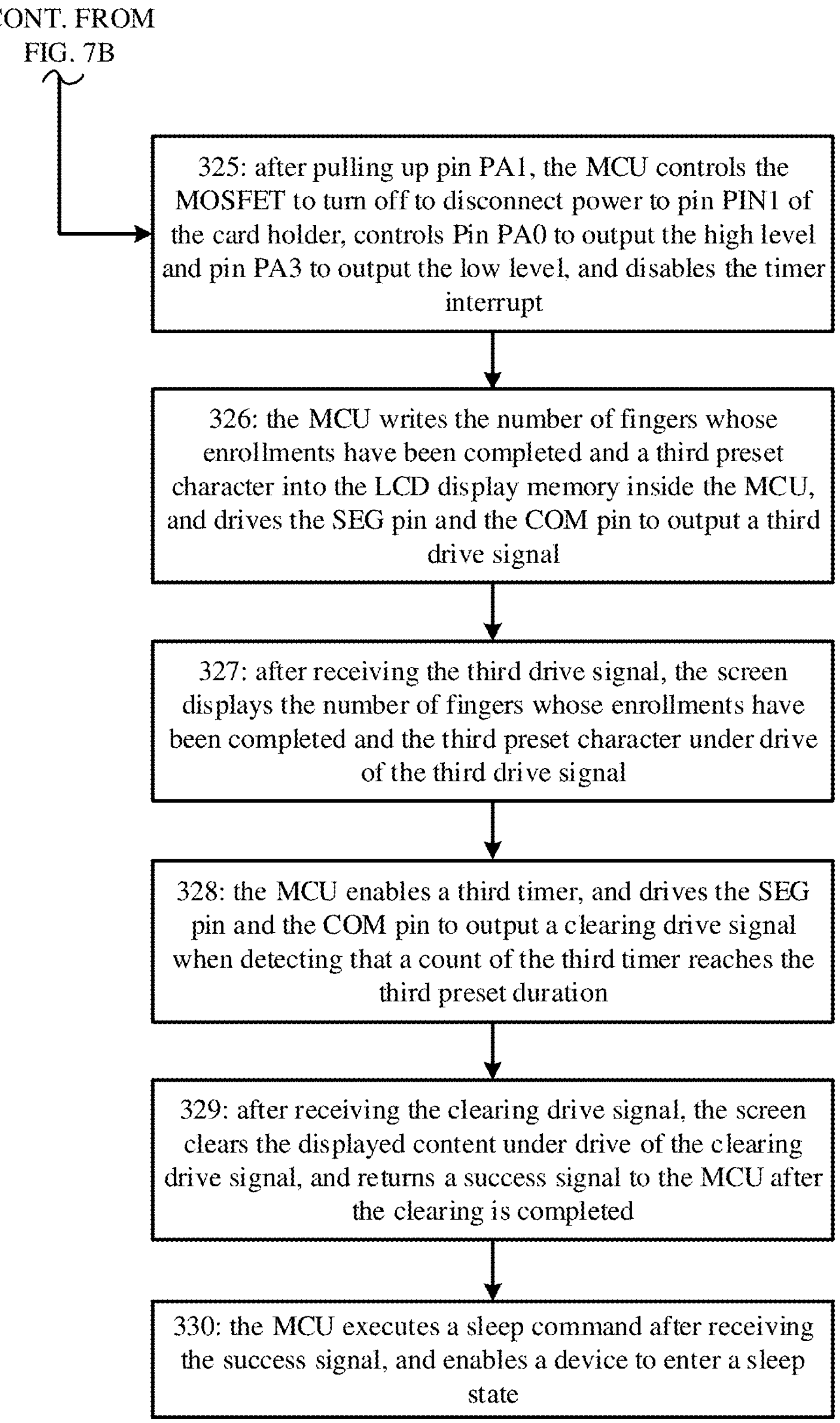

The third embodiment of the present disclosure provides a method for implementing fingerprint enrollment, which is applicable to a system including a device and a fingerprint card. The device includes an MCU, a screen, a battery, a card power control module, and a card holder; a fifth I/O pin of the MCU is connected to a MOSFET of the card power control module, and the MOSFET of the card power control module is connected to a fourth contact of the card holder, a first I/O pin, a second I/O pin, a third I/O pin, and a fourth I/O pin of the MCU are respectively connected to a first contact, a second contact, a third contact, and a card presence detect pin of the card holder. The first contact, the second contact, the third contact, the fourth contact, and a fifth contact of the card holder are respectively connected to a first pin, a second pin, a third pin, a fourth pin, and a fifth pin of a chip on the fingerprint card. As shown in FIGS. 5A to 5C, the method includes:

Step Y1: when the MCU detects a level change at the card presence detect pin of the card holder, after pulling down the fifth I/O pin, the MCU controls the MOSFET to turn on to supply power to the fourth contact of the card holder, and controls the second I/O pin to output a low level and the third I/O pin to output a high level;

Step Y2: the fingerprint card waits for a user to enroll his fingerprint after detecting that the second pin and the third pin are at the low level and the high level respectively;

Step Y3: the fingerprint card determines whether the fingerprint enrolled by the user is received within a preset time; if so, the fingerprint card outputs a square wave with a frequency of a first preset Hertz value through the first pin, and executes Step Y4; otherwise, the fingerprint card outputs a square wave with a frequency of a second preset Hertz value through the first pin, and Step Y5 is executed.

For example, in this step, the second preset Hertz value is 1 HZ, and the first preset Hertz value is 10 HZ.

Step Y4: the fingerprint card determines whether the received fingerprint is valid; if so, the fingerprint card outputs a low level through the first pin and Step Y5 is executed; otherwise, the fingerprint card outputs a high level through the first pin and executes Step Y5.

Step Y5: the MCU determines whether an output level of the first contact of the card holder is a high level; if so, the MCU executes Step Y6; otherwise, the method returns to Step Y5.

Step Y6: the MCU determines whether the output level of the first contact of the card holder is a low level; if so, the MCU enables and resets a second timer, and executes Step Y7; otherwise, the method returns to Step Y6.

Step Y7: the MCU determines whether the output level of the first contact of the card holder is the high level; if so, the MCU executes Step Y9; otherwise, the MCU executes Step Y8.

Step Y8: the MCU determines whether a count of the second timer is less than a second preset duration; if so, the method returns to Step Y7; otherwise, prompting that the fingerprint card is malfunctioning.

Step Y9: the MCU determines whether the count of the second timer is within a first preset range; if so, the MCU delays the second preset duration, and executes Step Y11; otherwise, the MCU executes Step Y10.

Step Y10: the MCU determines whether the count of the second timer is within a second preset range; if so, the method returns to Step Y6; otherwise, prompting that the fingerprint card is malfunctioning.

Step Y11: the MCU detects the output level of the first contact of the card holder; if it is the low level, prompting that the fingerprint enrollment is successful; if it is the high level, prompting that the fingerprint enrollment is failed.

In an implementation, if the fingerprint enrollment is failed, the fingerprint can be enrolled again. The method returns to Step Y3 after prompting that the fingerprint enrollment is failed in Step Y11.

In this embodiment, Step Y1 further includes: the MCU initializing a first timer, setting an interrupt time to a first preset duration, and enabling a timer interrupt.

The method further includes: entering a timer interrupt processing when the first timer reaches the first preset duration, where the timer interrupt processing includes prompting the user to enroll his fingerprint.

The device in this embodiment includes an MCU, a card holder and a display screen. The card holder is connected to a fingerprint card. The MCU determines a fingerprint enrollment progress of the fingerprint card by determining an output level of a first contact of the card holder, and prompts the fingerprint enrollment progress to the user using the display screen. The device in this embodiment is configured to assist the fingerprint card in completing the fingerprint enrollment. The technical solutions in the present disclosure enable communication methods between the device and the fingerprint card to be unrestricted by communication protocols, thereby making these solutions convenient and simple to use.

Fourth Embodiment

The fourth embodiment of the present disclosure provides a method for implementing fingerprint enrollment, applicable to a system including a device and a fingerprint card. The device includes an MCU, a screen, a battery, a card power control module, and a card holder. SEG and COM pins of the MCU are connected to the screen, pin PA1 of the MCU is connected to a MOSFET of the card power control module, and the MOSFET of the card power control module is connected to pin PIN1 of the card holder. Pins PB7, PA0, PA3, and PA2 of the MCU are respectively connected to pins PIN7, PIN2, PIN3 and PIN9 of the card holder, and the pins PIN7, PIN2, PIN3, PIN1, and PIN5 of the card holder are respectively connected to pins C7, C2, C3, C1, and C5 of a chip on the fingerprint card. Functions of individual pins of the chip on the fingerprint card are respectively as follows:

C1: supply power input (VCC), C2: reset signal input (RST), C3: clock signal input (CLK), C5: ground (GND), C7: input/output for serial data (I/O).

As shown in FIGS. 6A to 6D and 7A to 7C, the method of this embodiment includes:

Step 301: upon detecting a level change at pin PIN9 of the card holder, the MCU pulls low pin PA1, controls the MOSFET to turn on to supply power to pin PIN1 of the card holder, and controls pin PA0 to output a low level and pin PA3 to output a high level;

Step 302: the MCU initializes a first timer, presets an interrupt time to a first preset duration, enables a timer interrupt, sets to allow a fingerprint icon and a numeric icon to flash, and sets to allow the fingerprint icon and the numeric icon to be displayed.

Specifically, in this embodiment, the setting to allow the fingerprint icon and the numeric icon to flash, and setting to allow the fingerprint icon and the numeric icon to be displayed includes: setting control switches for a fingerprint flashing icon, a numeric flashing icon, a fingerprint display icon, and a numeric display icon.

For example, the first preset duration is 600 ms (milliseconds).

Step 303: the MCU initializes the number of times for which a fingerprint of each finger needs to be enrolled and the number of fingers that need to be enrolled.

Step 304: the fingerprint card waits for a user to enroll his fingerprint after detecting that pins C2 and C3 of a chip of the card are at the low level and high level respectively.

Step 305: the fingerprint card determines whether the fingerprint enrolled by the user through a fingerprint sensor is received within a preset time; if so, the fingerprint card outputs a square wave with a frequency of 10 HZ through pin C7 and executes Step 306; otherwise, the fingerprint card outputs a square wave with a frequency of 1 HZ through pin C7 and executes Step 307.

Step 306: the fingerprint card determines whether the received fingerprint is valid; if so, the fingerprint card outputs the low level through pin C7 and executes Step 307; otherwise, the fingerprint card outputs the high level through pin C7 and executes Step 307.

In an implementation, Step 306 of this embodiment specifically includes: the fingerprint card determining whether the received fingerprint is complete and has not been successfully enrolled; if so, outputting the low level through pin C7; otherwise, outputting the high level through pin C7.

For example, if the received fingerprint is incomplete or has been successfully enrolled, the high level will be output through pin C7.

Step 307: the MCU determines whether the output level of pin PIN7 of the card holder is the high level; if so, the MCU executes Step 308; otherwise, the method returns to Step 307.

Step 308: the MCU determines whether the output level of pin PIN7 of the card holder is the low level; if so, the MCU enables and resets a second timer, and executes Step 309; otherwise, the method returns to Step 308.

Step 309: the MCU determines whether the output level of pin PIN7 of the card holder is the high level; if so, the MCU executes Step 313; otherwise, the MCU executes Step 310.

Step 310: the MCU determines whether a count of the second timer is less than a second preset duration; if so, the method returns to Step 309; otherwise, the MCU executes Step 311.

For example, the second preset duration is 510 ms (milliseconds).

Step 311: the MCU writes a first preset character into an LCD display memory inside the MCU, and drives the SEG pin and the COM pin to output a first drive signal.

Step 312: after receiving the first drive signal, the screen displays the first preset character under drive of the first drive signal, and Step 328 is executed.

For example, the first preset character in this embodiment is !, indicating that the fingerprint card is malfunctioning.

Step 313: the MCU determines whether the count of the second timer is within a first preset range; if so, the MCU delays the second preset duration, and executes Step 315; otherwise, the MCU executes Step 314.

For example, the first preset range in this embodiment is greater than or equal to 48 and less than or equal to 52.

Step 314: the MCU determines whether the count of the second timer is within a second preset range; if so, the method returns to Step 307; otherwise, the method returns to Step 311.

For example, the second preset range in this embodiment is greater than or equal to 490 and less than or equal to 510.

Step 315: the MCU detects the output level of pin PIN7 of the card holder; if it is the low level, the MCU executes Step 318; if it is the high level, the MCU executes Step 316.

Step 316: the MCU writes a second preset character into the LCD display memory inside the MCU, and drives the SEG pin and the COM pin to output a second drive signal.

Step 317: after receiving the second drive signal, the screen displays the second preset character under drive of the second drive signal, and the method returns to Step 305.

For example, the second preset character in Step 317 is x, indicating that the fingerprint enrollment is failed.

In this embodiment, when the user finds out that the second preset character is displayed on the screen, the user enrolls his fingerprint again through the fingerprint sensor on the fingerprint card.

Step 318: the MCU updates the number of successful fingerprint enrollments for the current finger and sets to disallow the fingerprint icon from flashing.

Specifically, in this embodiment, the setting to disallow the fingerprint icon from flashing includes: resetting a fingerprint icon indicator.

For example, if an initial value of the number of successful fingerprint enrollments for the current finger is 0, the updating of the number of successful fingerprint enrollments for the current finger by the MCU specifically includes: the MCU incrementing the number of successful fingerprint enrollments for the current finger by 1.

Step 319: the MCU updates progress information based on the number of successful fingerprint enrollments for the current finger, writes the progress information into the LCD display memory inside the MCU, and drives the SEG pin and the COM pin to output a progress drive signal.

Step 320: after receiving the progress drive signal, the screen displays a corresponding progress based on the progress information under drive of the progress drive signal, and Step 321 is executed.

Step 321: the MCU determines whether the enrollment of the current finger has been completed based on the number of successful fingerprint enrollments for the current finger and the number of times for which the fingerprint of each finger needs to be enrolled; if so, the MCU executes Step 322; otherwise, the method returns to Step 305.

In this embodiment, Step 321 includes: the MCU determining whether the number of successful fingerprint enrollments for the current finger is the number of times for which the fingerprint of each finger needs to be enrolled; if so, it is determined that the enrollment of the current finger has been completed, and the MCU executes Step 322; otherwise, it is determined that the enrollment of the current finger has not been completed, and the method returns to Step 305.

In this embodiment, when the user finds out that there is no change on the screen, the fingerprint enrollment needs to be performed again through the fingerprint sensor on the fingerprint card.

Step 322: the MCU updates the number of fingers whose enrollments have been completed, determines whether another finger needs to be enrolled based on the number of fingers whose enrollments have been completed and the number of fingers that need to be enrolled; if so, the MCU takes a next to-be-enrolled finger as the current finger, and executes Step 323; otherwise, the MCU executes Step 325.

In an implementation, the initial value of the number of fingers whose enrollments have been completed is 0, and the updating of the number of fingers whose enrollments have been completed specifically includes: incrementing the number of fingers whose enrollments have been completed by 1.

Specifically, in this embodiment, Step 322 includes: the MCU determining whether the number of fingers whose enrollments have been completed is equal to the number of fingers that need to be enrolled; if so, there is no other finger need to be enrolled, and the MCU executes Step 325; otherwise, there is another finger that needs to be enrolled, and the MCU takes the next to-be-enrolled finger as the current finger, and executes Step 323.

Step 323: the MCU updates the number of fingers currently being enrolled based on the number of fingers whose enrollments have been completed, writes the number of fingers currently being enrolled into the LCD display memory inside the MCU, and drives the SEG pin and the COM pin to output a quantity drive signal.

Specifically, in this embodiment, the updating of the number of fingers currently being enrolled based on the number of fingers whose enrollments have been completed by the MCU includes: the MCU incrementing the number of fingers whose enrollments have been completed by 1 to obtain the number of fingers currently being enrolled.

Step 324: after receiving the quantity drive signal, the screen displays the number of fingers currently being enrolled under drive of the quantity drive signal, and the fingerprint icon is set to allow to flash, and the method returns to Step 305.

In this embodiment, when the user finds out that the number of fingers currently being enrolled is displayed on the screen, the fingerprint enrollment needs to be performed again through the fingerprint sensor on the fingerprint card.

Step 325: after pulling up pin PA1, the MCU controls the MOSFET to turn off to disconnect power to pin PIN1 of the card holder, controls Pin PA0 to output the high level and pin PA3 to output the low level, and disables the timer interrupt.

Step 326: the MCU writes the number of fingers whose enrollments have been completed and a third preset character into the LCD display memory inside the MCU, and drives the SEG pin and the COM pin to output a third drive signal.

Step 327: after receiving the third drive signal, the screen displays the number of fingers whose enrollments have been completed and the third preset character under drive of the third drive signal, and Step 328 is executed.

For example, in this embodiment, the third preset character is V, indicating that the fingerprint enrollment is successful.

Step 328: the MCU enables a third timer, and drives the SEG pin and the COM pin to output a clearing drive signal when detecting that a count of the third timer reaches the third preset duration.

For example, the third preset duration in this step is 30 s (seconds).

Step 329: after receiving the clearing drive signal, the screen clears the displayed content under drive of the clearing drive signal, and returns a success signal to the MCU after the clearing is completed.

Step 330: the MCU executes a sleep command after receiving the success signal, and enables the device to enter a sleep state.

Specifically, in this embodiment, it is possible to enter the timer interrupt processing when the first timer reaches the first preset duration. A workflow of the timer interrupt processing is the same as that in the second embodiment, which will not be elaborated here.

Fifth Embodiment

Figure 8:
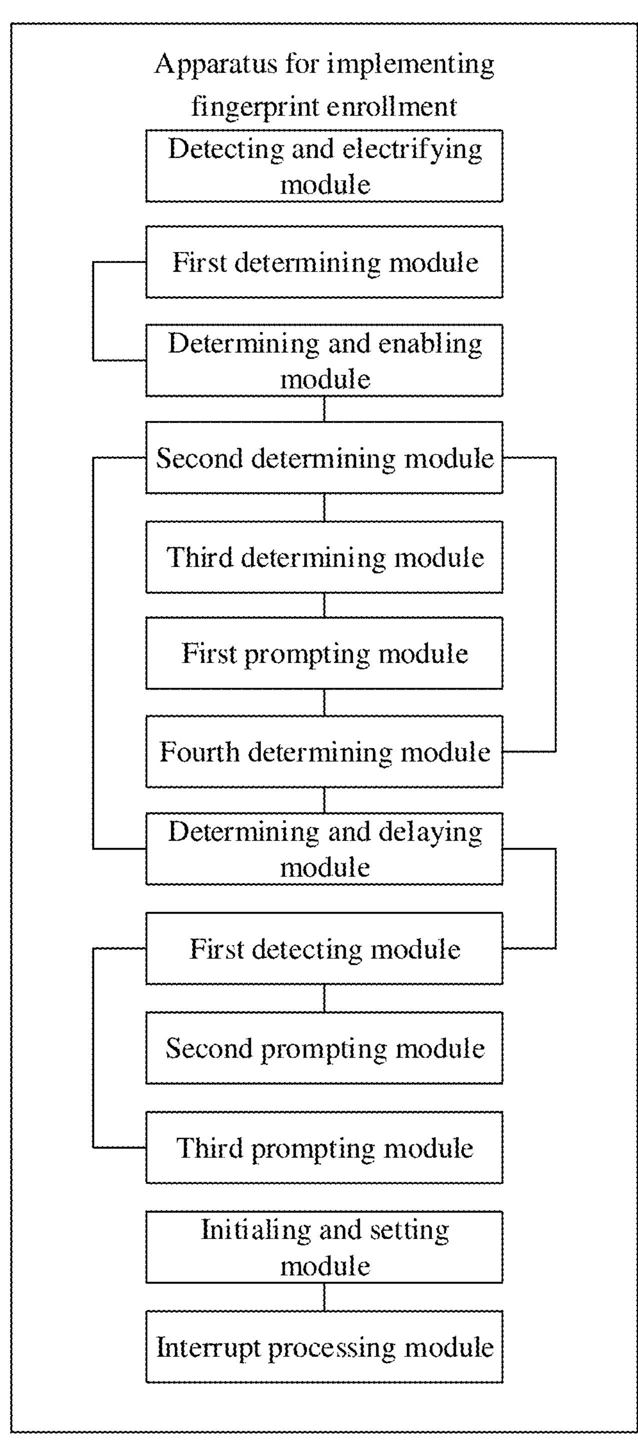
FIG. 8 is a block diagram of an apparatus for implementing fingerprint enrollment provided in a fifth embodiment of the present disclosure.

The fifth embodiment of the present disclosure provides an apparatus for implementing fingerprint enrollment. As shown in FIG. 8, the apparatus includes:

a detecting and electrifying module, configured to: upon detecting a level change at a card presence detect pin of the card holder, after pulling down a fifth I/O pin of the MCU, control a MOSFET to turn on to supply power to a fourth contact of a card holder, control a second I/O pin of an MCU to output a low level and a third I/O pin of the MCU to output a high level;

a first determining module, configured to determine whether an output level of a first contact of the card holder is a high level; if so, trigger a determining and enabling module;

the determining and enabling module is configured to determine whether the output level of the first contact of the card holder is a low level; if so, enable and reset a second timer, and trigger a second determining module;

the second determining module is configured to determine whether the output level of the first contact of the card holder is the high level; if so, trigger a determining and delaying module; otherwise, trigger a third determining module;

the third determining module is configured to determine whether a count of the second timer is less than a second preset duration; if so, trigger the second determining module; otherwise, trigger a first prompting module;

the first prompting module is configured to prompt that the fingerprint card is malfunctioning;

the determining and delaying module is configured to determine whether the count of the second timer is within a first preset range; if so, delay the second preset duration, and trigger a first detecting module; otherwise, trigger a fourth determining module;

the fourth determining module is configured to determine whether the count of the second timer is within a second preset range; if so, trigger the second determining module; otherwise, trigger the first prompting module;

the first detecting module is configured to detect the output level of the first contact of the card holder; if it is the low level, trigger a second prompting module; if it is the high level, trigger a third prompting module;

the second prompting module is configured to prompt that the fingerprint enrollment is successful;

the third prompting module is configured to prompt that the fingerprint enrollment is failed;

an initialing and setting module, configured to initialize a first timer, set an interrupt time to a first preset duration, and enable a timer interrupt;

an interrupt processing module, configured to prompt a user to enroll his fingerprint when the first timer reaches the first preset duration.

In an implementation, an embodiment of the present disclosure also provide a system for implementing fingerprint enrollment, including a device and a fingerprint card. The device includes an MCU, a screen, a battery, a card power control module, and a card holder; a fifth I/O pin of the MCU is connected to a MOSFET of the card power control module, and the MOSFET of the card power control module is connected to a fourth contact of the card holder; a first I/O pin, a second I/O pin, a third I/O pin, and a fourth I/O pin of the MCU are respectively connected to a first contact, a second contact, a third contact and a card presence detect pin of the card holder; the first contact, the second contact, the third contact, the fourth contact, and a fifth contact of the card holder are respectively connected to a first pin, a second pin, a third pin, a fourth pin, a fifth pin of a chip on the fingerprint card. The device and the fingerprint card are configured to implement the method for implementing fingerprint enrollment disclosed in the third embodiment.

In an implementation, an embodiment of the present disclosure also provide an electronic device. The electronic device includes at least one processor, a memory, and instructions stored on the memory and executable by the at least one processor. The at least one processor executes the instructions to implement the method for implementing fingerprint enrollment in the above embodiments. When the electronic device is a chip system, it can be composed of chips or include chips and other discrete components, which is not limited by embodiments of the present disclosure. The chip is coupled with a memory and configured to execute computer programs stored in the memory, in order to implement the method for implementing fingerprint enrollment disclosed in the above embodiments.

The above embodiments can be fully or partially implemented through software, hardware, firmware, or any combination thereof. When using software programs, it can be fully or partially implemented in the form of a computer program product. The computer program product includes one or more computer programs. When loading and executing the computer programs on an electronic device, all or part of processes or functions described in the embodiments of the present disclosure are generated. The computer program can be stored in a computer-readable storage medium or transmitted from one computer-readable storage medium to another. For example, the computer instructions can be transmitted from one base station, electronic device, server, or data center to another base station, electronic device, server, or data center via wired (such as a coaxial cable, fiber optic, a digital subscriber line (DSL)) or wireless (such as infrared, wireless, microwave and the like) means. The computer-readable storage medium can be any available medium that the electronic device can access, or it can include one or more data storage devices such as servers, data centers and the like that can be integrated by mediums. The available medium can be a magnetic medium (such as floppy disks, hard drives, magnetic tapes), an optical media (such as DVDs), or a semiconductor medium (such as solid state drives (SSD)), and the like. In the embodiments of the present disclosure, the electronic device may include the apparatus mentioned above.

Although the present disclosure has been described in conjunction with various embodiments, when implementing the process sought to be protected by the present disclosure, those skilled in the art can understand and implement other variations of the embodiments of the present disclosure by examining the accompanying drawings, disclosed content, and appended claims. In the claims, the word "comprising" does not exclude other components or steps, and "a" or "one" does not exclude multiple situations. A single processor or other unit can implement several functions listed in the claims. Different dependent claims describe certain measures, but this does not mean that these measures cannot be combined to produce good results.

Although the present disclosure has been described in conjunction with specific features and embodiments, it is evident that various modifications and combinations can be made without departing from the spirit and scope of the present disclosure. Correspondingly, this specification and the accompanying drawings are merely illustrative description of the present disclosure as defined by the claims, and are deemed to cover any and all modifications, variations, combinations, or equivalents within the scope of the present disclosure. Obviously, those skilled in the art can make various modifications and variations to the present disclosure without departing from the spirit and scope of the present disclosure. In this way, if these modifications and variations of the present disclosure fall within the scope of the claims and their equivalent technologies, then the present disclosure is also intended to include these modifications and variations

The invention claimed is:

1. An apparatus for implementing fingerprint enrollment, comprising:

at least one processor, a memory, and instructions stored on the memory and executable by the at least one processor, wherein the at least one processor executes the instructions to implement the following steps:

Step S1: upon detecting a level change at a card presence detect pin of a card holder, controlling, by a microcontroller unit (MCU), a MOSFET to turn on to supply power to a fourth contact of the card holder after pulling down a fifth I/O pin, and controlling, by the MCU, a second I/O pin to output a low level and a third I/O pin to output a high level;

Step S2: determining, by the MCU, whether an output level of a first contact of the card holder is a high level; if so, executing Step S3; otherwise, returning to the Step S2;

Step S3: determining, by the MCU, whether the output level of the first contact of the card holder is a low level; if so, enabling and resetting a second timer, and executing Step S4; otherwise, returning to the Step S3;

Step S4: determining, by the MCU, whether the output level of the first contact of the card holder is the high level; if so, executing Step S6; otherwise, executing Step S5;

Step S5: determining, by the MCU, whether a count of the second timer is less than a second preset duration; if so, returning to the Step S4; otherwise, prompting that a fingerprint card is malfunctioning;

Step S6: determining, by the MCU, whether the count of the second timer is within a first preset range; if so, delaying the second preset duration and executing Step S8; otherwise, executing Step S7;

Step S7: determining, by the MCU, whether the count of the second timer is within a second preset range; if so, returning to the Step S3; otherwise, prompting that the fingerprint card is malfunctioning;

Step S8: detecting, by the MCU, the output level of the first contact of the card holder; if the output level of the first contact of the card holder is the low level, prompting that the fingerprint enrollment is successful; if the output level of the first contact of the card holder is the high level, prompting that the fingerprint enrollment is failed;

between the Step S1 and the Step S2, the at least one processor further executes the instructions to implement the following steps: initializing, by the MCU, a first timer, setting an interrupt time to a first preset duration, and enabling a timer interrupt; and and the at least one processor further executes the instructions to implement the following steps: entering a timer interrupt processing when the first timer reaches the first preset duration, wherein the timer interrupt processing comprises prompting a user to enroll a fingerprint.

2. The apparatus according to claim 1, wherein the at least one processor further executes the instructions to implement the following steps:

writing, by the MCU, a first preset character into a display memory inside the MCU, driving, by the MCU, a drive pin to output a first drive signal;

after receiving the first drive signal, displaying, by a screen, the first preset character under drive of the first drive signal;

wherein the prompting that the fingerprint enrollment is failed, comprises:

writing, by the MCU, a second preset character into the display memory inside the MCU, driving, by the MCU, a drive pin to output a second drive signal;

after receiving the second drive signal, displaying, by the screen, the second preset character under drive of the second drive signal;

wherein the prompting that the fingerprint enrollment is successful, comprises:

writing, by the MCU, a number of successful fingerprint enrollments and a third preset character into the display memory inside the MCU, and driving, by the MCU, a drive pin to output a third drive signal; and after receiving the third drive signal, displaying, by the screen, the number of successful fingerprint enrollments and the third preset character under drive of the third drive signal.

3. The apparatus according to claim 1, wherein the at least one processor further executes the instructions to implement the following steps between the Step S1 and the Step S2: initializing, by the MCU, a number of times for which a fingerprint of each finger needs to be enrolled and/or a number of fingers that need to be enrolled;

before the prompting that the fingerprint enrollment is successful in the Step S8, the at least one processor further executes the instructions to implement the following steps: enrolling a fingerprint of a current finger multiple times and/or enrolling fingerprints of multiple fingers;

wherein the enrolling a fingerprint of a current finger multiple times comprises:

Step P1: updating, by the MCU, a number of successful fingerprint enrollments for the current finger and prompting an enrollment progress;

Step P2: determining, by the MCU, whether the enrollment of the current finger has been completed based on the number of successful fingerprint enrollments for the current finger and the number of times for which the fingerprint of each finger needs to be enrolled; if so, the enrollment for the current finger has been completed; otherwise, returning to the Step S2;

wherein the enrolling fingerprints of multiple fingers comprises:

Step Q1: after the enrollment of the current finger has been completed, updating, by the MCU, a number of fingers whose enrollments have been completed, determining whether another finger needs to be enrolled based on the number of fingers whose enrollments have been completed and the number of fingers that need to be enrolled; if so, taking a next to-be-enrolled finger as the current finger, and executing Step Q2; otherwise, executing Step Q3;

Step Q2: prompting, by the MCU, a number of fingers currently being enrolled, and returning to the Step S2; and Step Q3: after pulling up the fifth I/O pin, controlling, by the MCU, the MOSFET to turn off to disconnect power to the fourth contact of the card holder, and controlling, by the MCU, the second I/O pin to output a high level and the third I/O pin to output a low level.

4. The apparatus according to claim 3, wherein the at least one processor further executes the instructions to implement the following steps:

updating, by the MCU, progress information based on the number of successful fingerprint enrollments for the current finger, writing the progress information into a display memory inside the MCU, and driving, by the MCU, a drive pinto output a progress drive signal;

after receiving the progress drive signal, displaying, by a screen, a fingerprint enrollment progress based on the progress information under drive of the progress drive signal;

wherein the prompting, by the MCU, a number of fingers currently being enrolled, comprises:

Step Q21: updating, by the MCU, the number of fingers currently being enrolled based on the number of fingers whose enrollments have been completed, writing the number of fingers currently being enrolled into the display memory inside the MCU, and driving, by the MCU, a drive pin to output a quantity drive signal; and Step Q22: after receiving the quantity drive signal, displaying, by the screen, the number of fingers currently being enrolled under drive of the quantity drive signal.

5. The apparatus according to claim 3, wherein between Step S1 and Step S2, the at least one processor further executes the instructions to implement the following steps: setting, by the MCU, to allow a fingerprint icon and a numeric icon to flash, and setting, by the MCU, to allow the fingerprint icon and the numeric icon to be displayed;

wherein the prompting the user to enroll the fingerprint, comprises:

Step A1: determining, by the MCU, whether the fingerprint icon is allowed to flash; if so, executing Step A2; otherwise, executing Step A7;

Step A2: determining, by the MCU, whether the fingerprint icon is allowed to be displayed; if so, executing Step A3; otherwise, executing Step A5;

Step A3: writing, by the MCU, the fingerprint icon into a display memory inside the MCU, and driving, by the MCU, a drive pin to output a fingerprint drive signal;

Step A4: after receiving the fingerprint drive signal, displaying, by a screen, the fingerprint icon under drive of the fingerprint drive signal, and Step A7 is executed;

Step A5: clearing, by the MCU, the fingerprint icon in the display memory inside the MCU and driving, by the MCU, a drive pin to output a clearing drive signal;

Step A6: after receiving the clearing drive signal, clearing, by the screen, the displayed fingerprint icon under drive of the clearing drive signal, and Step A7 is executed;

Step A7: determining, by the MCU, whether the numeric icon is allowed to flash; if so, executing Step A8; otherwise, exiting the timer interrupt;

Step A8: determining, by the MCU, whether the numeric icon is allowed to be displayed; if so, executing Step A9; otherwise, executing Step A11;

Step A9: writing, by the MCU, the numeric icon indicating the number of fingers currently being enrolled into the display memory inside the MCU, and driving, by the MCU, a drive pin to output a numeric drive signal;

Step A10: after receiving the numeric drive signal, displaying, by the screen, the numeric icon under drive of the numeric drive signal, and the timer interrupt is exited;

Step A11: clearing, by MCU, the numeric icon in the display memory inside the MCU and driving, by MCU, a drive pin to output a clearing drive signal;

Step A12: after receiving the clearing drive signal, clearing, by the screen, the displayed numeric icon under drive of the clearing drive signal, and the timer interrupt is exited;

when enrolling the fingerprint of each finger multiple times and enrolling the fingerprints of the multiple fingers, the Step P1 further comprises: setting to disallow the fingerprint icon from flashing;

Step Q2 further comprises: setting to allow the fingerprint icon to flash; and

Step Q3 further comprises: disabling the timer interrupt.

6. The apparatus according to claim 1, wherein after prompting that the fingerprint card is malfunctioning and/or prompting that the fingerprint enrollment is successful, the at least one processor further executes the instructions to implement the following steps:

Step D1: enabling, by the MCU, a third timer, and driving, by the MCU, a drive pin to output a clearing drive signal when a count of the third timer reaches a third preset duration;

Step D2: after receiving the clearing drive signal, clearing, by a screen, displayed content under drive of the clearing drive signal, and returning, by the screen, a success signal to the MCU after the clearing is completed; and Step D3: after receiving the success signal, executing, by the MCU, a sleep command, and enabling a device to enter a sleep state.

7. A method for implementing fingerprint enrollment, comprising:

Step S1: upon detecting a level change at a card presence detect pin of a card holder, controlling, by a microcontroller unit (MCU), a MOSFET to turn on to supply power to a fourth contact of the card holder after pulling down a fifth I/O pin, and controlling, by the MCU, a second I/O pin to output a low level and a third I/O pin to output a high level;

Step S2: determining, by the MCU, whether an output level of a first contact of the card holder is a high level; if so, executing Step S3; otherwise, returning to the Step S2;

Step S3: determining, by the MCU, whether the output level of the first contact of the card holder is a low level; if so, enabling and resetting a second timer, and executing Step S4; otherwise, returning to the Step S3;

Step S4: determining, by the MCU, whether the output level of the first contact of the card holder is the high level; if so, executing Step S6; otherwise, executing Step S5;

Step S5: determining, by the MCU, whether a count of the second timer is less than a second preset duration; if so, returning to the Step S4; otherwise, prompting that a fingerprint card is malfunctioning;

Step S6: determining, by the MCU, whether the count of the second timer is within a first preset range; if so, delaying the second preset duration and executing Step S8; otherwise, executing Step S7;

Step S7: determining, by the MCU, whether the count of the second timer is within a second preset range; if so, returning to the Step S3; otherwise, prompting that the fingerprint card is malfunctioning;

Step S8: detecting, by the MCU, the output level of the first contact of the card holder; if the output level of the first contact of the card holder is the low level, prompting that the fingerprint enrollment is successful; if the output level of the first contact of the card holder is the high level, prompting that the fingerprint enrollment is failed;

between the Step S1 and the Step S2, the method comprises: initializing, by the MCU, a first timer, setting an interrupt time to a first preset duration, and enabling a timer interrupt; and the method further comprises: entering a timer interrupt processing when the first timer reaches the first preset duration, wherein the timer interrupt processing comprises prompting a user to enroll a fingerprint.

8. The method according to claim 7, wherein prompting that the fingerprint card is malfunctioning, comprises:

writing, by the MCU, a first preset character into a display memory inside the MCU, driving, by the MCU, a drive pin to output a first drive signal;

after receiving the first drive signal, displaying, by a screen, the first preset character under drive of the first drive signal;

wherein the prompting that the fingerprint enrollment is failed, comprises:

writing, by the MCU, a second preset character into the display memory inside the MCU, driving, by the MCU, a drive pin to output a second drive signal;

after receiving the second drive signal, displaying, by the screen, the second preset character under drive of the second drive signal;

wherein the prompting that the fingerprint enrollment is successful, comprises:

writing, by the MCU, a number of successful fingerprint enrollments and a third preset character into the display memory inside the MCU, and driving, by the MCU, a drive pin to output a third drive signal; and after receiving the third drive signal, displaying, by the screen, the number of successful fingerprint enrollments and the third preset character under drive of the third drive signal.

9. The method according to claim 7, wherein between Step S1 and Step S2, the method comprises: initializing, by the MCU, a number of times for which a fingerprint of each finger needs to be enrolled and/or a number of fingers that need to be enrolled;

before the prompting that the fingerprint enrollment is successful in the Step S8, the method further comprises: enrolling a fingerprint of a current finger multiple times and/or enrolling fingerprints of multiple fingers;

wherein the enrolling a fingerprint of a current finger multiple times comprises:

Step P1: updating, by the MCU, a number of successful fingerprint enrollments for the current finger and prompting an enrollment progress;

Step P2: determining, by the MCU, whether the enrollment of the current finger has been completed based on the number of successful fingerprint enrollments for the current finger and the number of times for which the fingerprint of each finger needs to be enrolled; if so, the enrollment for the current finger has been completed; otherwise, returning to the Step S2;

wherein the enrolling fingerprints of multiple fingers comprises:

Step Q1: after the enrollment of the current finger has been completed, updating, by the MCU, a number of fingers whose enrollments have been completed, determining whether another finger needs to be enrolled based on the number of fingers whose enrollments have been completed and the number of fingers that need to be enrolled; if so, taking a next to-be-enrolled finger as the current finger, and executing Step Q2; otherwise, executing Step Q3;

Step Q2: prompting, by the MCU, a number of fingers currently being enrolled, and returning to the Step S2; and Step Q3: after pulling up the fifth I/O pin, controlling, by the MCU, the MOSFET to turn off to disconnect power to the fourth contact of the card holder, and controlling, by the MCU, the second I/O pin to output a high level and the third I/O pin to output a low level.

10. The method according to claim 9, wherein prompting the enrollment progress comprises:

updating, by the MCU, progress information based on the number of successful fingerprint enrollments for the current finger, writing the progress information into a display memory inside the MCU, and driving, by the MCU, a drive pinto output a progress drive signal;

after receiving the progress drive signal, displaying, by a screen, a fingerprint enrollment progress based on the progress information under drive of the progress drive signal; and wherein the prompting, by the MCU, a number of fingers currently being enrolled, comprises:

Step Q21: updating, by the MCU, the number of fingers currently being enrolled based on the number of fingers whose enrollments have been completed, writing the number of fingers currently being enrolled into the display memory inside the MCU, and driving, by the MCU, a drive pin to output a quantity drive signal;

Step Q22: after receiving the quantity drive signal, displaying, by the screen, the number of fingers currently being enrolled under drive of the quantity drive signal.

11. The method according to claim 9, wherein between Step S1 and Step S2, the method further comprises: setting, by the MCU, to allow a fingerprint icon and a numeric icon to flash, and setting, by the MCU, to allow the fingerprint icon and the numeric icon to be displayed;

wherein the prompting the user to enroll the fingerprint, comprises:

Step A1: determining, by the MCU, whether the fingerprint icon is allowed to flash; if so, executing Step A2; otherwise, executing Step A7;

Step A2: determining, by the MCU, whether the fingerprint icon is allowed to be displayed; if so, executing Step A3; otherwise, executing Step A5;

Step A3: writing, by the MCU, the fingerprint icon into a display memory inside the MCU, and driving, by the MCU, a drive pin to output a fingerprint drive signal;

Step A4: after receiving the fingerprint drive signal, displaying, by a screen, the fingerprint icon under drive of the fingerprint drive signal, and Step A7 is executed;

Step A5: clearing, by the MCU, the fingerprint icon in the display memory inside the MCU and driving, by the MCU, a drive pin to output a clearing drive signal;

Step A6: after receiving the clearing drive signal, clearing, by the screen, the displayed fingerprint icon under drive of the clearing drive signal, and Step A7 is executed;

Step A7: determining, by the MCU, whether the numeric icon is allowed to flash; if so, executing Step A8; otherwise, exiting the timer interrupt;

Step A8: determining, by the MCU, whether the numeric icon is allowed to be displayed; if so, executing Step A9; otherwise, executing Step A11;

Step A9: writing, by the MCU, the numeric icon indicating the number of fingers currently being enrolled into the display memory inside the MCU, and driving, by the MCU, a drive pin to output a numeric drive signal;

Step A10: after receiving the numeric drive signal, displaying, by the screen, the numeric icon under drive of the numeric drive signal, and the timer interrupt is exited;

Step A11: clearing, by MCU, the numeric icon in the display memory inside the MCU and driving, by MCU, a drive pin to output a clearing drive signal;

Step A12: after receiving the clearing drive signal, clearing, by the screen, the displayed numeric icon under drive of the clearing drive signal, and the timer interrupt is exited;

when enrolling the fingerprint of each finger multiple times and enrolling the fingerprints of the multiple fingers, the Step P1 further comprises: setting to disallow the fingerprint icon from flashing;

Step Q2 further comprises: setting to allow the fingerprint icon to flash; and Step Q3 further comprises: disabling the timer interrupt.

12. The method according to claim 7, wherein after the prompting that the fingerprint card is malfunctioning and/or prompting that the fingerprint enrollment is successful, the method further comprises:

Step D1: enabling, by the MCU, a third timer, and driving, by the MCU, a drive pin to output a clearing drive signal when a count of the third timer reaches a third preset duration;

Step D2: after receiving the clearing drive signal, clearing, by a screen, displayed content under drive of the clearing drive signal, and returning, by the screen, a success signal to the MCU after the clearing is completed;

Step D3: after receiving the success signal, executing, by the MCU, a sleep command, and enabling a device to enter a sleep state.

13. A non-transitory computer-readable storage medium comprising a computer program, wherein the computer program enables an electronic device to perform the method according to claim 7 when run on the electronic device.

14. A method for implementing fingerprint enrollment, applicable for a system comprising a device and a fingerprint card, wherein the device comprises a microcontroller unit (MCU), a screen, a battery, a card power control module, and a card holder; a fifth I/O pin of the MCU is connected to a MOSFET of the card power control module, and the MOSFET of the card power control module is connected to a fourth contact of the card holder; a first I/O pin, a second I/O pin, a third I/O pin, and a fourth I/O pin of the MCU are respectively connected to a first contact, a second contact, a third contact and a card presence detect pin of the card holder; the first contact, the second contact, the third contact, the fourth contact, and a fifth contact of the card holder are respectively connected to a first pin, a second pin, a third pin, a fourth pin, and a fifth pin of a chip on the fingerprint card, and the method comprises:

Step Y1: when the MCU detects a level change at the card presence detect pin of the card holder, controlling, by the MCU, the MOSFET to turn on to supply power to the fourth contact of the card holder after pulling down the fifth I/O pin, and controlling, by the MCU, the second I/O pin to output a low level and the third I/O pin to output a high level;

Step Y2: waiting, by the fingerprint card, for a user to enroll a fingerprint after detecting that the second pin and the third pin are at the low level and the high level respectively;

Step Y3: determining, by the fingerprint card, whether the fingerprint enrolled by the user is received within a preset time; if so, outputting a square wave with a frequency of a first preset Hertz value through the first pin, and executing Step Y4; otherwise, outputting a square wave with a frequency of a second preset Hertz value through the first pin, and Step Y5 is executed;

Step Y4: determining, by the fingerprint card, whether the received fingerprint is valid; if so, outputting a low level through the first pin, and Step Y5 is executed; otherwise, outputting a high level through the first pin, and Step Y5 is executed;

Step Y5: determining, by the MCU, whether an output level of the first contact of the card holder is a high level; if so, executing Step Y6; otherwise, returning to the Step Y5;

Step Y6: determining, by the MCU, whether the output level of the first contact of the card holder is a low level; if so, enabling and resetting a second timer, and executing Step Y7; otherwise, returning to the Step Y6;

Step Y7: determining, by the MCU, whether the output level of the first contact of the card holder is the high level; if so, executing Step Y9; otherwise, executing Step Y8;

Step Y8: determining, by the MCU, whether a count of the second timer is less than a second preset duration; if so, returning to the Step Y7; otherwise, prompting that the fingerprint card is malfunctioning;

Step Y9: determining, by the MCU, whether the count of the second timer is within a first preset range; if so, delaying the second preset duration, and executing Step Y11; otherwise, executing Step Y10;

Step Y10: determining, by the MCU, whether the count of the second timer is within a second preset range; if so, returning to the Step Y6; otherwise, prompting that the fingerprint card is malfunctioning;

Step Y11: detecting, by the MCU, the output level of the first contact of the card holder; if the output level of the first contact of the card holder is the low level, prompting that the fingerprint enrollment is successful; if the output level of the first contact of the card holder is the high level, prompting that the fingerprint enrollment is failed;

the Step Y1 further comprises: initializing, by the MCU, a first timer, setting an interrupt time to a first preset duration, and enabling a timer interrupt; and the method further comprises: entering a timer interrupt processing when the first timer reaches the first preset duration, wherein the timer interrupt processing comprises prompting the user to enroll a fingerprint.

15. A system for implementing fingerprint enrollment, comprising a device and a fingerprint card; the device comprises a microcontroller unit (MCU), a screen, a battery, a card power control module, and a card holder; a fifth I/O pin of the MCU is connected to a MOSFET of the card power control module, and the MOSFET of the card power control module is connected to a fourth contact of the card holder; a first I/O pin, a second I/O pin, a third I/O pin, and a fourth I/O pin of the MCU are respectively connected to a first contact, a second contact, a third contact and a card presence detect pin of the card holder; the first contact, the second contact, the third contact, the fourth contact, and a fifth contact of the card holder are respectively connected to a first pin, a second pin, a third pin, a fourth pin, and a fifth pin of a chip on the fingerprint card; wherein the device and the fingerprint card are configured to implement the method according to claim 14.

16. A non-transitory computer-readable storage medium comprising a computer program, wherein the computer program enables an electronic device to perform the method according to claim 14 when run on the electronic device.

* * * * *